(12) United States Patent
Xu et al.

(10) Patent No.: US 10,727,909 B2
(45) Date of Patent: Jul. 28, 2020

(54) ELECTRONIC DEVICE, COMMUNICATION METHOD AND STORAGE MEDIUM IN WIRELESS COMMUNICATION SYSTEM

(71) Applicant: Sony Corporation, Tokyo (JP)

(72) Inventors: Jin Xu, Beijing (CN); Chaonan He, Beijing (CN); Jianfei Cao, Beijing (CN)

(73) Assignee: SONY CORPORATOPM, Tokyo (JP)

( * ) Notice: Subject to any disclaimer, the term of this patent is extended or adjusted under 35 U.S.C. 154(b) by 0 days.

(21) Appl. No.: 16/314,663

(22) PCT Filed: May 4, 2018

(86) PCT No.: PCT/CN2018/085646
§ 371 (c)(1),
(2) Date: Jan. 1, 2019

(87) PCT Pub. No.: WO2018/223794
PCT Pub. Date: Dec. 13, 2018

(65) Prior Publication Data
US 2019/0260429 A1   Aug. 22, 2019

(30) Foreign Application Priority Data

Jun. 8, 2017 (CN) .......................... 2017 1 0427221

(51) Int. Cl.
*H04B 7/0417* (2017.01)
*H04B 7/0452* (2017.01)
(Continued)

(52) U.S. Cl.
CPC ......... *H04B 7/0417* (2013.01); *H04B 7/0452* (2013.01); *H04B 7/0456* (2013.01);
(Continued)

(58) Field of Classification Search
CPC .. H04B 17/309; H04B 7/0417; H04B 7/0452; H04B 7/0456; H04B 7/06; H04B 7/0626;
(Continued)

(56) References Cited

U.S. PATENT DOCUMENTS 10,433,282 B2 * 10/2019 Montojo ............. H04W 52/241
2005/0143084 A1 * 6/2005 Cheng .................. H04L 1/0028
455/452.2

(Continued)

FOREIGN PATENT DOCUMENTS

| CN | 1902970 A | 1/2007 |
| CN | 102868500 A | 1/2013 |
| CN | 103312400 A | 9/2013 |

OTHER PUBLICATIONS

International Search Report dated Jul. 16, 2018 for PCT/CN2018/085646 filed on May 4, 2018, 8 pages including English translation.

*Primary Examiner* — Mewale A Ambaye
(74) *Attorney, Agent, or Firm* — Xsensus LLP

(57) ABSTRACT

An electronic device on the user side comprising a processing circuitry configured to report to a network control device a first type of channel state information (CSI) by using a resource for the first type of channel state feedback allocated by the network control device; make a determination that a second type of channel state feedback is required; and notify the network control device of the determination.

19 Claims, 15 Drawing Sheets

(51) Int. Cl.
  *H04B 7/0456* (2017.01)
  *H04B 7/06* (2006.01)
  *H04L 5/00* (2006.01)
  *H04W 72/04* (2009.01)
  *H04W 24/10* (2009.01)
  *H04B 17/309* (2015.01)
(52) U.S. Cl.
  CPC ............ *H04B 7/06* (2013.01); *H04B 7/0626* (2013.01); *H04B 17/309* (2015.01); *H04L 5/0051* (2013.01); *H04W 24/10* (2013.01); *H04W 72/04* (2013.01); *H04W 72/0413* (2013.01); *H04W 72/0466* (2013.01)
(58) Field of Classification Search
  CPC .... H04B 7/0636; H04W 24/10; H04W 72/04; H04W 72/0413; H04W 72/0466; H04W 5/0057; H04L 5/0023; H04L 5/0051
  See application file for complete search history.

(56) References Cited

U.S. PATENT DOCUMENTS

| | | | |
|---|---|---|---|
| 2012/0275313 A1 | 11/2012 | Prasad et al. | |
| 2014/0112300 A1* | 4/2014 | Han | H04L 67/36 370/329 |
| 2016/0344487 A1 | 11/2016 | Lee et al. | |
| 2017/0020854 A1* | 1/2017 | Licht | A61K 9/2846 |
| 2017/0310441 A1* | 10/2017 | Wei | H04L 1/1812 |
| 2018/0049047 A1* | 2/2018 | Lin | H04W 72/04 |
| 2018/0192415 A1* | 7/2018 | Takahashi | H04W 24/10 |

\* cited by examiner

ELECTRONIC DEVICE, COMMUNICATION METHOD AND STORAGE MEDIUM IN WIRELESS COMMUNICATION SYSTEM

CROSS-REFERENCE TO RELATED APPLICATIONS

This application is a National Stage Application based on PCT/CN2018/085646, filed on 4 May 2018, and claims priority to Chinese Patent Application No. 201710427221.0, filed on 8 Jun. 2017, the entire contents of which being incorporated herein by reference.

TECHNICAL FIELD

The present disclosure relates to an electronic device, a communication method and a storage medium in wireless communication system, and in particular, to an electronic device, a communication method and a storage medium for channel state feedback/reporting in wireless communication system.

BACKGROUND ART

With further development of wireless communication technologies, techniques for reporting channel state information (CSI) is playing an increasingly important role. The channel state information reflects properties of a wireless channel and describes fading factors of a signal on a transmission path, such as signal scattering, environmental fading, range fading and the like. The conventional channel state feedback is typically based on PMI codebook, and can provide information such as Channel Quality Indicator (CQI), Precoding Matrix Indicator (PMI), Rank Indicator (RI), Channel State Information Reference Signal Resource Indicator (CSI-RS Resource Indicator, CRI) or the like. Based on the acquired channel state information, it is possible to adapt the communication system to the current channel state, thereby guaranteeing high-reliability and high-rate communications, especially for multi-antenna communication system.

In addition, an enhanced channel state feedback is now being discussed at present. As compared with the convention channel state feedback, the enhanced channel state feedback is able to provide channel state information with a higher spatial resolution (with a smaller granularity) and/or with a higher richness, and thus, it is possible to obtain accurate channel information even in case of acute channel scattering or angle scattering. However, the enhanced channel state feedback requires more overhead on processing and transmission.

The inventors of the present disclosure have noticed there may be a requirement to choose an appraD1ate channel state feedback as needed.

For example, Multiple Input Multiple Output (MIMO) is a critical technique for the physical layer in the 4G communication or even in the 5G communication, and the industry has come up with various techniques for enhancing MIMO, in which multi-user MIMO (MU-MIMO) is a hot issue in theoretical research and standardization, and is lively discussed in the standardization of the next generation NR MIMO. Among others, the accuracy of the channel state information is most important to MU MIMO, especially in case of a large number of transmitting antennas. However, in a MU MIMO scenario such as downlink multi-user spatial multiplexing, communication resources used by the users are required to have sufficiently good spatial orthogonality therebetween.

As shown in FIG. 1, two users UE1 and UE2, which are close geographically, perform data transmission with the base station through the MU MIMO. When the orthogonality between each of the users and the base station is bad, the inter-channel interference is increased, and it is possible to cause a reduction of the accuracy of the channel state information reported by the users and thus a reduction of performance of the MU MIMO. In this case, there is a need to use a more accurate channel state feedback.

In addition to the scenario as described above, there may be other cases where the communication system is required to use another channel state feedback different from the current one.

SUMMARY OF THE INVENTION

An object of the present application is to propose a technology for changing the type of the channel state feedback so as to meet the need as described above.

A brief overview regarding the present disclosure is given hereinafter, for purpose of a basic understanding of some aspects of the present disclosure. However, it will be appreciated that the overview is not an exhaustive description of the present disclosure. It is not intended to specify key portions or important portions of the present disclosure, nor to limit the scope of the present disclosure. It aims at describing some concepts about the present disclosure in a simplified form and serves as a preorder of a more detailed description given later.

According to an aspect of the present disclosure, there provides an electronic device on a side of user, comprising a processing circuitry configured to report to a network control device a first type of channel state information by using a resource for the first type of channel state feedback allocated by the network control device, make a determination that a second type of channel state feedback is required, and notify the network control device of the determination.

According to an aspect of the present disclosure, there provides an electronic device on a side of network control, comprising a processing circuitry configured to allocate a resource for a first type of channel state feedback to a user device, receive from the user device an notification regarding a determination that a second type of channel state feedback is required, allocate a resource for the second type of channel state feedback to the user device; and receive the second type of channel state information.

According to an aspect of the present disclosure, there provides an electronic device on the side of network control, comprising a processing circuitry configured to allocate a resource for a first type of channel state feedback to a user device, make a determination that a second type of channel state feedback is required, and notify the user device of the determination.

According to an aspect of the present disclosure, there provides an electronic device on the side of user, comprising a processing circuitry configured to report to a network control device a first type of channel state information by using a resource for the first type of channel state feedback allocated by the network control device, receive from the network control device an notification regarding a determination that a second type of channel state feedback is required, and report to the network control device the second type of channel state information by using a resource for the second type of channel state feedback allocated by the network control device.

According to an aspect of the present disclosure, there provides a communication method on the side of user, comprising reporting to a network control device a first type of channel state information by using a resource for the first type of channel state feedback allocated by the network control device, making a determination that a second type of channel state feedback is required, and notifying the network control device of the determination.

According to an aspect of the present disclosure, there provides a communication method on the side of network control, comprising allocating a resource for a first type of channel state feedback to a user device, making a determination that a second type of channel state feedback is required, and notifying the user device of the determination.

According to an aspect of the present disclosure, there provides a communication method on the side of network control, comprising allocating a resource for a first type of channel state feedback to a user device, receiving from the user device an notification regarding a determination that a second type of channel state feedback is required, allocating a resource for the second type of channel state feedback to the user device; and receiving the second type of channel state information.

According to an aspect of the present disclosure, there provides a communication method on the side of user, comprising reporting to a network control device a first type of channel state information by using a resource for the first type of channel state feedback allocated by the network control device, receiving from the network control device an notification regarding a determination that a second type of channel state feedback is required, and reporting to the network control device the second type of channel state information by using a resource for the second type of channel state feedback allocated by the network control device.

According to an aspect of the present disclosure, there provides A non-transitory computer readable storage medium storing executable instructions which, when executed, implements any of the communication methods as described above.

According to each of the aspects of the present disclosure, the wireless communication system is able to employ appropriate channel state feedback as needed, and thus can make an optimum compromise between the accuracy of the channel state information and the overhead.

BRIEF DESCRIPTION OF THE DRAWINGS

A better understanding of the present disclosure can be achieved by referring to the detailed description given hereinafter in connection with the accompanying figures, wherein same or similar reference signs are used to indicate same or similar components throughout the figures. The figures are included in the specification and form a part of the specification along with the following detailed descriptions, for further illustrating embodiments of the present disclosure and explaining the theory and advantages of the present disclosure. Wherein.

Further features of the present invention will become apparent from the following description of exemplary embodiments with reference to the attached drawings.

DESCRIPTION OF EMBODIMENTS

The illustrative embodiments of the invention will be described hereinafter with reference to the drawings. For purpose of clarity and simplicity, not all features are described in the specification. Note that, however, many settings specific to the implementations can be made in implementing the invention according specific requirements, so as to achieve specific goals of the developers, for example, to comply with the limiting conditions related to apparatus and service, which vary from one implementation to another. Furthermore, it will be appreciated that the developing work will be a routine task, despite complex and tedious, for those skilled in the art who benefit from the present disclosure.

In addition, note that the figures illustrate only steps of a process and/or components of a device that are closely related to the technical solutions of the invention, and omit other details that are in little relation to the invention.

Next, detailed descriptions will be given for the illustrative embodiments and application examples according to the invention with reference the accompanying drawings.

The First Embodiment 1.1 The Electronic Device on the Side of User and Its Communication Method According to the First Embodiment The electronic device 200 on the side of user and its communication method according to the first embodiment will be described below with reference to FIGS. 2A and 2B.

Figure 1:
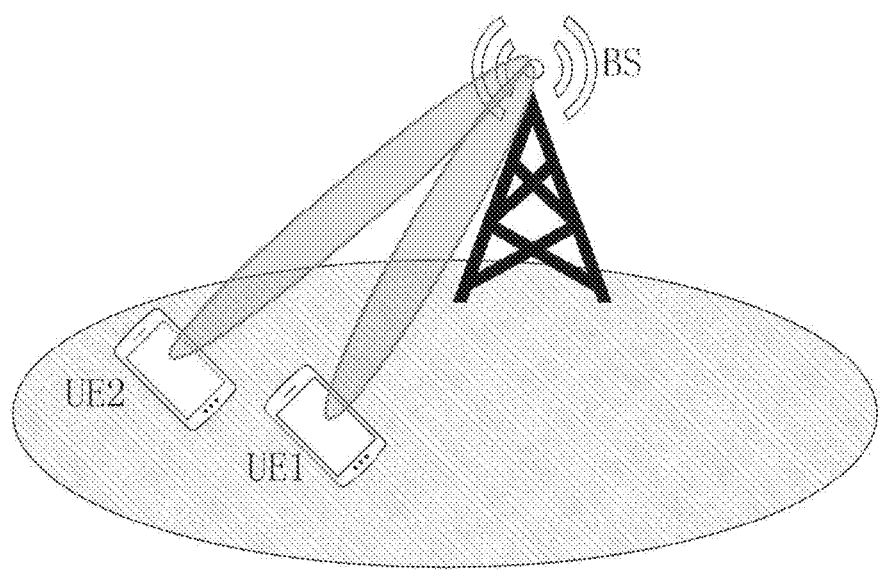
FIG. 1 illustrates a scenario where user devices, which are close geographically, carry out MU MIMO.
Figure 2A:
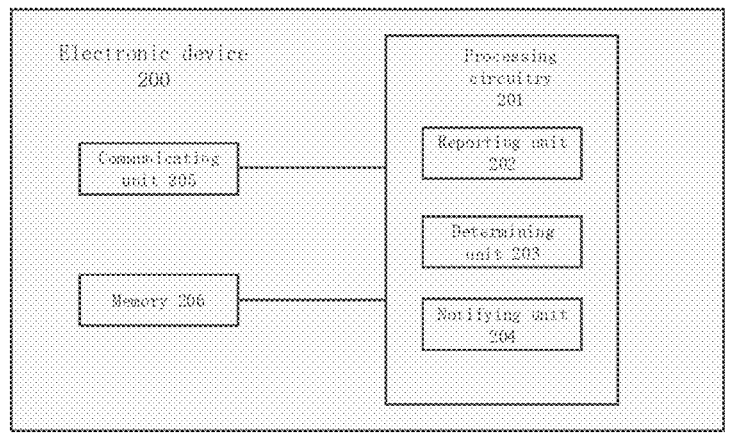
FIG. 2A is a block diagram illustrating an electronic device on the side of user according to a first embodiment of the present disclosure.

FIG. 2A is a block diagram illustrating the electronic device 200 according to the first embodiment. The electronic device 200 is a user device such as mobile phone, in-vehicle device, a tablet or the like or its element. As illustrated in FIG. 2A, the electronic device 200 includes at least a processing circuitry 201. The processing circuitry 201 of the electronic device 200 provides various functionalities of the electronic device 200. For example, the processing circuitry 201 can include a reporting unit 202, a determining unit 203 and a notifying unit 204.

The reporting unit 202 is configured to report channel state information (CSI) by using a resource for channel state feedback allocated by a network control device. As used herein, the network control device (for example, the electronic device 300 as described below) is a base station such as eNB in the 4G communication standard or gNB in the 5G communication standard or a communication apparatus performing similar functionalities as the base station, but is not limited to this. Typically, to acquire information on channel state of a communication channel between the electronic device 200 and the network control device, the network control device allocates to the electronic device 200 a resource for the channel state feedback, for example, reference signals such as cell-specific reference signal (CRS) or CSI reference signal (CSI-RS), pilot signals or the like, in order to perform channel evaluation. Hereinafter, CSI-RS is used frequently as example of the "resource for channel state feedback", but those skilled in the art will appreciate that the present disclosure is not intended to limit this and any appropriate reference signals can be used. Depending on the specific type of the channel feedback and the frequency of desirably acquiring the CSI, the resource for channel state feedback may be aperiodic, semi-persistent or periodic. The reporting unit 202 of the electronic device 200 can acquire desired CSI by measuring the reference signal such as CSI-RS, and report the acquired CSI to the network control device.

The reporting unit 202 may perform the channel state feedback in many manners. For example, the reporting unit 202 may perform the channel state feedback in an implicit manner, that is, report to the network control device information characterizing the channel state, such as CQI, PMI, RI, CRI or the like. Alternatively, the reporting unit 202 can perform the channel state feedback in an explicit manner, that is, report channel parameters directly or compressed channel parameters to the network control device.

The reporting unit 202 can perform the enhanced channel state feedback in addition to the conventional one based on PMI-codebook. The enhanced channel state feedback includes several categories: precoded feedback based on linearly combined codebook, feedback for channel covariance matrix and hybrid CSI feedback. These feedback categories can provide CSI with a higher resolution, a higher accuracy, and a richer content, and can be collectively referred to as the enhanced channel state feedback.

Specifically, the precoded feedback based on linearly combined codebook, for example, may be a feedback based on a two-level codebook W=W1W2, wherein W1 represents a set of L orthogonal beams selected from two-dimensional discrete Fourier transform (2D DFT) beams by oversampling basis vectors composed by the 2D DFT beams, in which the beam selection is in a granularity of wideband. W2 represents a linear combination of the L beams in W1, L is configurable and can be 2, 3, 4, 6 or the like. With respect to linear combination coefficients of the beams in W2, the granularity of phase quantization is subband, and the quantization granularity of magnitude scaling factors can be wideband or subband. The feedback for channel covariance matrix is a feedback after quantizing or compressing the channel variance matrix based on a set of M orthogonal basis vectors, and what is reported can include the M basis vectors and respective coefficients, and the granularity of the reporting for variance matrix is wideband. The hybrid CSI feedback, for example, can combine the codebook of the two channel state feedback described above and the channel state feedback of LTE (for example, LTE-Class-B-type-like CSI feedback).

The determining unit 203 of the electronic device 200 is configured to make a determination that whether the type of channel state feedback needs to be changed. The determining unit 203 can perform such determination process based on various factors, including requirements a communication service has on the content or accuracy of the CSI, channel interferences such as inter-user interference, overhead on the processing and transmission of the CSI, or the like. In the present disclosure, assuming that the current channel state feedback is of a first type and is used to report the first type of CSI. The determining unit 203 can determine a second type of channel state feedback is to be used to report the second type of CSI. The first type is different from the second type. The determining unit 203 further determines the specific category of the second type of channel state feedback.

In one example, in response to having detected a channel interference or the accuracy of the CSI required by the communication service getting higher, the determining unit 203 can make the following determination. CSI with a higher accuracy is to be reported, that is, the accuracy of the second type of channel state feedback is higher than the first type of channel state feedback. In one example, in response to having detected a favorable channel state or the accuracy of CSI required by the communication service being not high, the determining unit 203 can make the following determination: CSI with a lower accuracy is to be reported, that is, the accuracy of the second type of channel state feedback is lower than the first type of channel state feedback. In one example, based on requirements the communication has on the reported content, the determining unit 203 can make a determination that a channel state feedback related to the reported content is to be performed, that is, the second type of channel state feedback is to report the reported content as needed, for example, CQI, PMI, RI, CRI, channel parameters or compressed channel parameters, channel covariance matrix, or the like. After the determining unit 203 has determined the specific category of the second type of channel state feedback, the determination result is presented to the notifying unit 204 so as to notify the network control device.

The notifying unit 204 is configured to notify the network control device (for example, the electronic device 300 as described below) of the determination result made by the determining unit 203. The notifying unit 204 may perform the notifying by generating a message including the determination result and send it to the network control device. For example, the determination result can be included in uplink control information (UCI) transmitted via physical uplink control channel (PUCCH) or physical uplink shared channel (PUSCH), or can be included in a starting portion of a CSI packet transmitted via the PUSCH. Alternatively, the determination result can be included in a newly defined signaling and reported via the PUCCH or PUSCH. The information on the determination result may indicate the specific category of channel state feedback which is desired to be made next, thereby the network control device can learn which channel state feedback is to be performed next upon receiving the notification issued by the notifying unit 204, and allocates corresponding resources (e.g. CSI-RS) for the reporting unit 202 to perform the second type of channel state feedback.

The electronic device 200 can further include a communication unit 205 and a memory 200.

The communication unit 205 of the electronic device 200 can be configured to communicate with the network control device under control of the processing circuitry 201, to send the notification including the determination result, the CSI or the like to the network control device. The communication unit 205 can be implemented as a transmitter or a transceiver. In one example, the communication unit 205 can be implemented as a communication interface component of an antenna device, a radio frequency circuit and the like. The communication unit 205 is depicted with broken lines, since it may also reside within the processing circuitry 201 or outside the electronic device 200.

The memory 206 of the electronic device 200 can store various information generated by the processing circuitry 201 (e.g. the determination result of the determining unit 203), program or data used by the electronic device 200 to operate, data or information to be transmitted by the communication unit 205 (e.g. the CSI). The memory 205 is depicted by broken lines, since it may also reside within the processing circuitry or outside the electronic device 200. The memory 206 can be a volatile memory and/or a non-volatile memory. For example, the memory 206 may include but is not limited to a random access memory (RAM), a dynamic random access memory (DRAM), a static random access memory (SRAM), a read only memory (ROM), a flash memory.

Figure 2B:
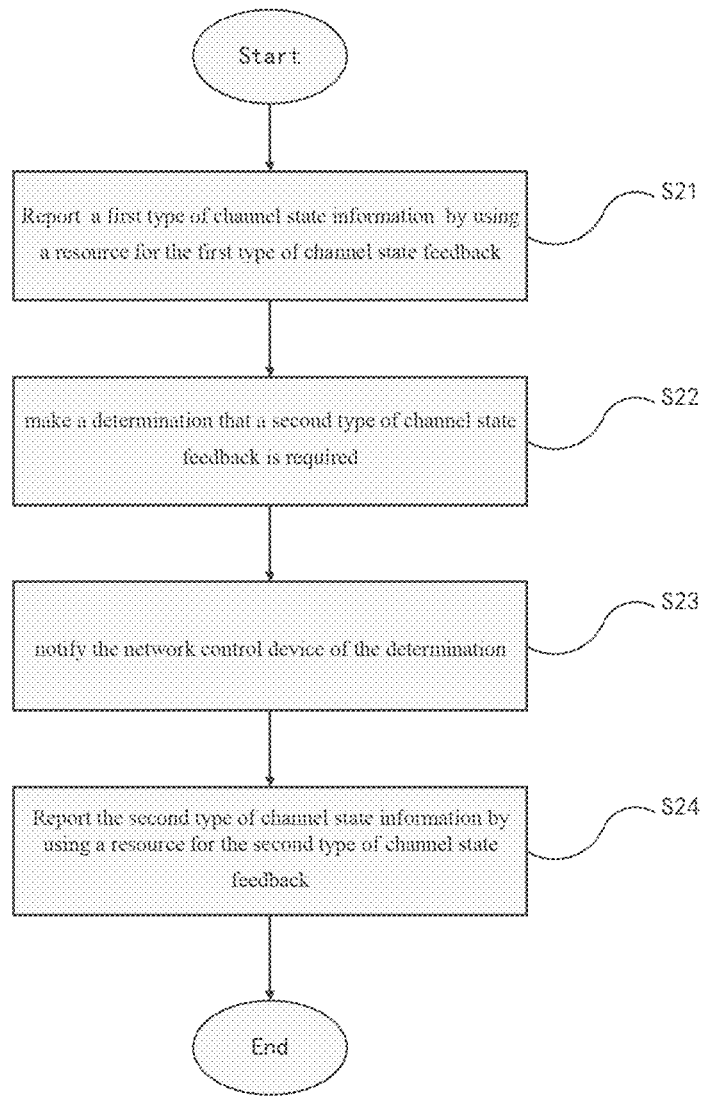
FIG. 2B is a signaling flowchart of a communication method performed by the electronic device on the side of user according to the first embodiment of the present disclosure.

FIG. 2B depicts a communication method performed by the electronic device 200 on the side of user.

As shown in FIG. 2B, in step S21, the reporting unit 202 can report to a network control device the first type of CSI by using a resource for the first type of channel state feedback allocated by the network control device. The type of the channel state feedback performed by reporting unit 202 is associated with the resource allocated by the network control device. For example, in an example, the network control device can allocate periodic CSI-RS resources to the electronic device 200, such that the reporting unit 202 can measure, for example, CQI, parameters related with channel matrix or the like based on the CSI-RS resources, and report these CSI to the network control device periodically.

In step S22, the determining unit 203 of the electronic device 200 determines whether the second type of channel state feedback is needed. The determination process can be performed based on various factors, and examples of the determination process will be described in detail later in the following Section 1.3. For purpose of illustration, assuming that when severe channel interferences are detected, in order to ensure the accuracy of the CSI, the determining unit 203 can determine that a channel state feedback which is different from the first type of channel state feedback and has a higher accuracy is to be employed, for example, the determining unit 203 can make a determination that any of the feedback based on linearly combined codebook, the feedback for covariance matrix, and the hybrid channel state feedback. If the determining unit 203 determines that the type of the channel state feedback need not to be changed, the reporting unit 202 will continue to perform the first type of channel state feedback.

In step S23, the notifying unit 204 of the electronic device 200 notifies the network control device of the determination result made by the determining unit 203. Such notifying process can be implemented by generating and transmitting a message including the specific category of the second type of channel state feedback. Specific examples of the notifying process will be described in the following Section 1.4. Thereby, upon receiving the notification, the network control device is able to learn which channel state feedback is to be employed next and to allocate corresponding CSI-RS resources.

Optionally, as shown in the broken-line box, the communication method performed by the electronic device 200 can further include a step S24. In step S24, the reporting unit 202 of the electronic device 200 can report the second type of CSI by using the resources (e.g. (CSI-RS) for the second type of channel state feedback allocated by the network control device. Note that at the moment, the reporting unit 202 may stop the first type of channel state feedback and perform only the second type of channel state feedback, or may perform the first type of channel state feedback and the second type of channel state feedback simultaneously.

1.2 The Electronic Device on the Side of Network Control and Its Communication Method According to the First Embodiment The electronic device 300 on the side of network control and its communication method according to the first embodiment will be described below with reference to FIGS. 3A and 3B.

Figure 3A:
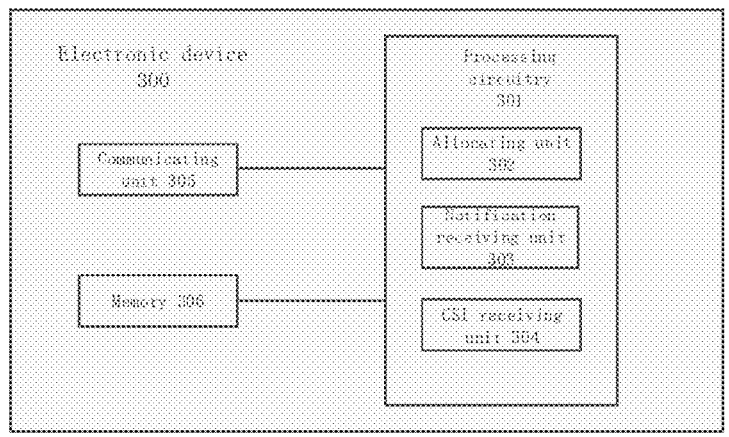
FIG. 3A is a block diagram illustrating an electronic device on the side of network control according to the first embodiment of the present disclosure.

FIG. 3A is a block diagram illustrating the electronic device 300 according to the first embodiment. The electronic device 300 is a base station such as eNB in the 4G communication standard or gNB in the 5G communication standard, or a communication means performing similar functionalities. The electronic device 300 includes at least a processing circuitry 301. The processing circuitry 301 provides various functionalities of the electronic device 300. For example, the processing circuitry 301 can include an allocating unit 302, a notification receiving unit 303 and a CSI receiving unit 304.

The allocating unit 302 of the electronic 300 is configured to allocate a resource for channel state feedback to a user device (e.g. the electronic device 200) depending to the type of the channel state feedback. The resource for channel state feedback can be various downlink reference signals or pilot signals, such as CRS, CSI-RS or the like. The allocating unit 302 can allocate reference signals for different types of channel state feedback as needed. The reference signals such as CSI-RS or the like is associated with particular time and frequency resources, for purpose of a channel evaluation under these particular time and frequency resources. In one example, the allocating unit 302 can allocate CSI-RS resources periodically, for the user device to measure conventional CSI such as CQI, PMI, RI and the like. However, if the notification receiving unit 303 as described below receives a notification that another type of channel state feedback needs to be performed, the allocating unit 302 can allocate CSI-RS resources for the channel state feedback which is of the category indicated in this notification.

The notification receiving 303 of the electronic device 300 is configured to receive the notification regarding whether there is a need to perform another type of channel state feedback different from the current type of channel state feedback. This notification can be included in an UCI signaling message or a newly defined signaling message, and indicates the specific category of the another type of channel state feedback.

After receiving the notification, the electronic device 300 can learn the category of the channel state feedback to be performed next, and thus allocate corresponding resources for the channel state feedback to the user device, such as CSI-RS resources.

The CSI receiving unit 304 is configured to receive CSI from the user device, and depending on the specific category of the ongoing channel state feedback, the CSI may include CQI, PMI, RI, CRI, channel parameters or compressed channel parameters, channel covariance matrix, or the like. The received CSI provides an estimate of the current wireless transmission environment, and can provide a reference for the resource scheduling or precoding of the downlink transmission.

The electronic device 300 can further include a communication unit 305 and a memory 306.

The communication unit 305 of the electronic device 300 can be configured to communicate with the user device under control of the processing circuitry 301. The communication unit 305 can be implemented as a transceiver. In one example, the communication unit 305 can be implemented as a communication interface component of an antenna device, a radio frequency circuit, and the like. The communication unit 305 is depicted with broken lines, since it can also reside within the processing circuitry 301 or outside the electronic device 300.

The memory 306 of the electronic device 300 can store various information generated by the processing circuitry 301, program or data used by the electronic device 300 to operate, data or information to be transmitted by the communication unit 305. The memory 306 is depicted by broken lines, since it can also reside within the processing circuitry 301 or outside the electronic device 300. The memory 306 can be volatile memory and/or non-volatile memory. For example, the memory 306 can include but is not limited to a random access memory (RAM), a dynamic random access memory (DRAM), a static random access memory (SRAM), a read only memory (ROM), a flash memory.

The communication method performed by the electronic device 300 will be described below with reference to FIG. 3B.

Figure 3B:
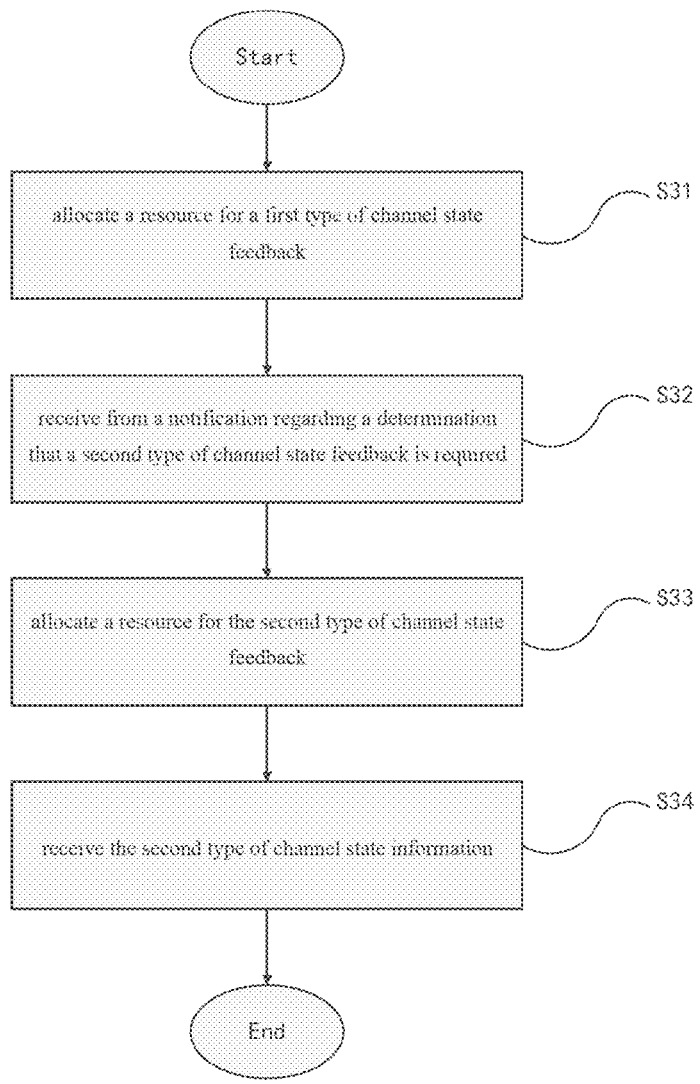
FIG. 3B is a signaling flowchart of a communication method performed by the electronic device on the side of network control according to the first embodiment of the present disclosure.

As shown in FIG. 3B, in step S31, the allocating unit 302 of the electronic device 300 allocates the resource of the first type of channel state feedback to the user device. For example, in one example, the network control device can allocate periodic CSI-RS resources to the user device (e.g. the electronic device 200 as described above), for the user device to periodically report the channel state information such as CQI, PMI, RI.

Then, in step S32, the notification receiving unit 303 of the electronic device 300 receives from the user device the notification regarding the determination that the second type of channel state channel needs to be performed, wherein the second type is different from the first type. Such notification includes indicative information about the specific category of the second type of channel state feedback.

In step S33, depending on the indicative information, the electronic device 300 is able to determine which channel state report is to be performed next, and allocate the resource for the second type of channel state feedback, such as CSI-RS resource, to the user device by the allocating unit 301.

Next, in step S34, the CSI receiving unit 304 of the electronic device 300 receives the second type of CSI reported by the user device, such as the CSI based on linearly combined codebook, the channel covariance matrix, the hybrid CSI or the like, which has a higher accuracy.

When receiving the second type of CSI, the CSI receiving unit 304 can stop receiving the first type of CSI. Alternatively, the CSI receiving unit 304 can receive both the second type of CSI and the first type of CSI.

1.3 The Determination Process According to the First Embodiment

As explained in the above section, in the first embodiment of the present disclosure, the determination process of determining whether there is a need to perform another channel state feedback of the type different from that of the current channel state feedback is done at the device on the side of user (e.g. the electronic device 200). The determination process is performed in consideration of various factors. For purpose of illustration, an example of such determination process implemented in the multi-user communication scenario is described in detail below. As used herein, the multi-user communication for example is the MU MIMO communication.

In the MU MIMO communication, multiple user devices, which are close geographically to each other, are brought into the communication system by spatial multiplexing, and each user device is allocated with one or more layers for data transmission. The layers used by individual user device are independent of each other, but depending on the orthogonality between the layers used by respective user devices, there is inter-layer interference to some extent. When the inter-layer interference is severe, the transmission performance of the MU MIMO communication is reduced, which may cause the accuracy of the CSI to decrease.

By evaluating such inter-layer interference, it can be determined whether the current channel state feedback meets the need or not.

1.3.1 Determination Process Based on Orthogonality Between Communication Resources When the communication is carried out with multiplexing and multiple-access technology, the inter-user interference depends greatly on the orthogonality between communication resources used by the user devices. Generally speaking, the orthogonality between the communication resources (e.g. layers in the spatial multiplexing) allocated to respective user devices is better, the inter-user interference is smaller, and on the contrary the inter-user interference is larger. Therefore, based on the orthogonality between the communication resources used by the user devices, it can be determined whether to switch to another type of channel state feedback.

In one example, the orthogonality can be decided based on demodulation reference signal (DMRS) ports corresponding to respective layers of each user device. In the case where a single user device may use a plurality of layers, there are different DMRS ports corresponding to respective layers. The DMRS is an uplink reference signal introduced in Release 10 for LTE, and is used for correlated demodulation of the uplink control channel and the uplink data channel. Scrambling code sequence of the DMRS is selected from a predefined set of scrambling code sequences by the user device, and is identified by scrambling code sequence number. Since the scrambling code sequence can indicate corresponding DMRS port, the orthogonality between layers used by different user devices can be decided by a correlation degree between the scrambling code sequences of respective DMRS ports.

Figure 4A:
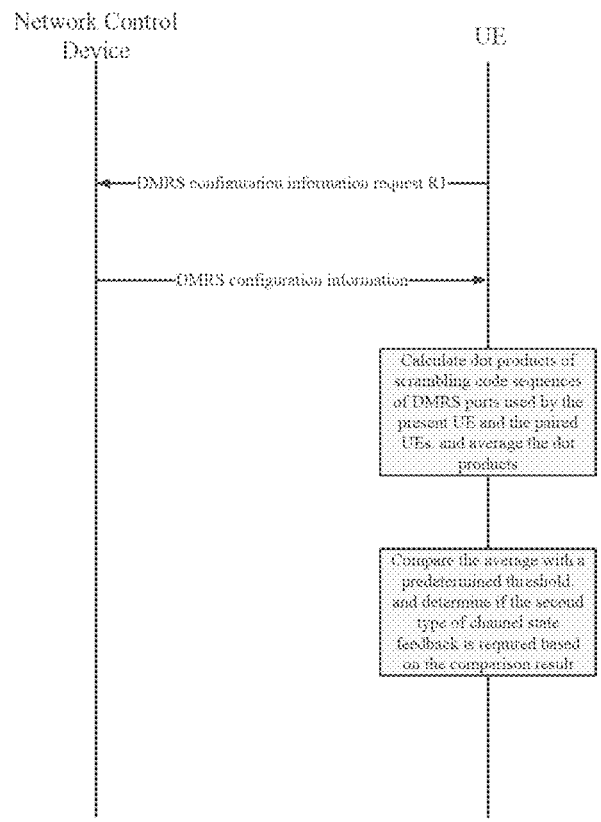
FIG. 4A illustrates an example of a determination process according to the first embodiment of the present disclosure.

FIG. 4A is flowchart of an example of the determination process based on DMRS configuration information.

First, as shown by the dotted arrow, the present user device (the user device performing the communication method according to the first embodiment) and other paired user devices involved in the multi-user communication report the DMRS configuration information to the network control device, after the DMRS configurations are determined. The DMRS configuration information reported by the user device can include: DMRS port number or the user device, the scrambling code sequence number, the cell number, the time-frequency mapping location, and the like. Such reporting process can be completed during a prescheduling for the multi-user communication, and the DMRS configuration information reported by all user devices are saved at the network control device.

Then, the present user device transmits a DMRS configuration information request R1 to the network control device. In response to receiving the request R1, the network control device transmits the DMRS configuration information to the present user device. Since the present user device has saved the information related to its own DMRS configuration, the network control device needs to transmit the DMRS configuration information of other paired user devices except the present user device, to reduce an amount of the transmission.

Next, after having acquired the DMRS configuration information of the other paired user devices, the present user device can decide a correlation degree between the scrambling code sequences of its m (m≥1) DMRS ports and the scrambling code sequences of DMRS ports (n in total, n≥1) of each paired user device.

For example, a dot product of the scrambling code sequence of each DMRS port of the present user device and the scrambling code sequence of each DMRS port of the other paired user device can be calculated, and m×n dot products can be obtained in total. In one example, an average can be calculated for the m×n dot products, and the average indicates an overall correlation degree between the scrambling code sequences. Then, the average is compared with a predetermined threshold, and when the average is larger than the predetermined threshold, it can be assumed that the overall correlation degree between the scrambling code sequences of DMRS ports used by the present user device and by the other paired user devices is high, that is, the orthogonality between the layers used by the present user device and by the other paired user devices is bad, and it is apt to cause severe inter-layer interferences. Accordingly, the present user device (e.g. the determining unit 203 of the electronic device 200) can determine there is a need to use the channel state feedback with a higher accuracy. When the average is smaller or equal to the predetermined threshold, it can be assumed that the orthogonality between the layers used by the present user device and by the other paired user devices is good, and it is not apt to cause severe inter-layer interferences. Accordingly, the present user device (e.g. the determining unit 203 of the electronic device 200) can determine there is no need to use the channel state feedback with a hither accuracy.

Alternatively, an average can be calculated for a subset of the m×n dot products, so as to judge the correlation degree between the scrambling code sequences for a single DMRS port of the present user device, such that it is determined there is a need to use a more accurate channel state feedback, as long as a certain layer of the present user device is apt to be interfered.

Although an approach of judging the correlation degree of scrambling code sequences by calculating the dot product of two scrambling code sequences is described above, other approaches can be used, for example, by calculating a cosine similarity, an Euclidean distance or the like between two scrambling code sequences.

1.3.2 Determination Process Based on a Degradation Degree of Channel Quality In determining if there is a need to perform another type of channel state feedback or not, it can be based on the degradation degree of channel quality of the channel between the user device and the network control device, in addition to based on the orthogonality between communication resources used by the user device.

When the wireless channel between the user device and the network control device is interfered, it may be likely to cause a degradation of the channel state and a reduction of the channel quality, such that the accuracy of the channel state feedback is reduced. For example, when the user device is switched from a single-user communication to a multi-user communication (e.g. MU MIMO), the channel of the present user device is apt to be interfered by the communication of other user devices. Therefore, it can be determined whether there is a need to employ a more accurate channel state feedback by detecting the degradation degree of the channel quality.

Figure 4B:
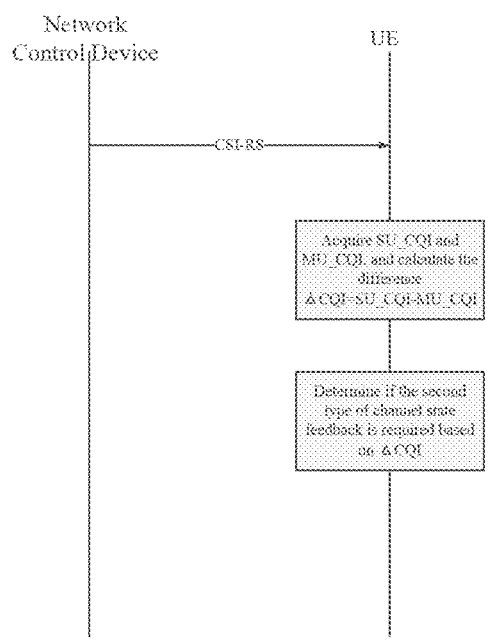
FIG. 4B illustrates another example of the determination process according to the first embodiment of the present disclosure.

FIG. 4B illustrates a flowchart of an example of the determination process based on the degradation degree of the channel quality.

First, during the multi-user communication such as MU MIMO involving the user device, the network control device allocates CSI-RS resources for channel state feedback to the user device, and the user device can acquire CSI such as CQI based on the CSI-RS resources. The CQI acquired at this time indicates a channel quality during the multi-user communication of the user device, and is denoted as MU_CQI.

Thereafter, the user device can calculate a difference between the MU-CQI and a CQI acquired during a single-user communication before the multi-user communication, $\Delta CQI = SU\_CQI - MU\_CQI$, wherein $\Delta CQI$ indicates the degradation degree of the channel quality of the user device during the multi-user communication due to inter-user interferences, relative to the channel quality during the single-user communication.

Then, the user device can determine whether there is a need to employ another type of channel state feedback based on ΔCQI. For example, if ΔCQI is larger than a predetermined threshold, it can be assumed that the channel quality may be degraded enough to affect the accuracy of channel state feedback, and accordingly, the user device (e.g. the determining unit 203 of the electronic device 200) can determine whether there is a need to use a more accurate channel state feedback. On the contrast, if ΔCQI is not larger than the predetermined threshold, it can be assumed that the channel quality has not been degraded enough to affect the accuracy of the channel state feedback, and accordingly, the user device can determine there is no need to change the type of channel state feedback.

1.3.3 Pre-Determination Process

In the first embodiment, during determining whether there is a need to perform another type of channel state feedback, in addition to performing the determination process as in FIG. 4A or FIG. 4B, the pre-determination process can be performed first, and then the determination process as in FIG. 4A or FIG. 4B is performed. Wherein the pre-determination process aims at coarsely evaluating the current channel state, so as to decide whether it is necessary to perform the subsequent determination process.

Figure 4C:
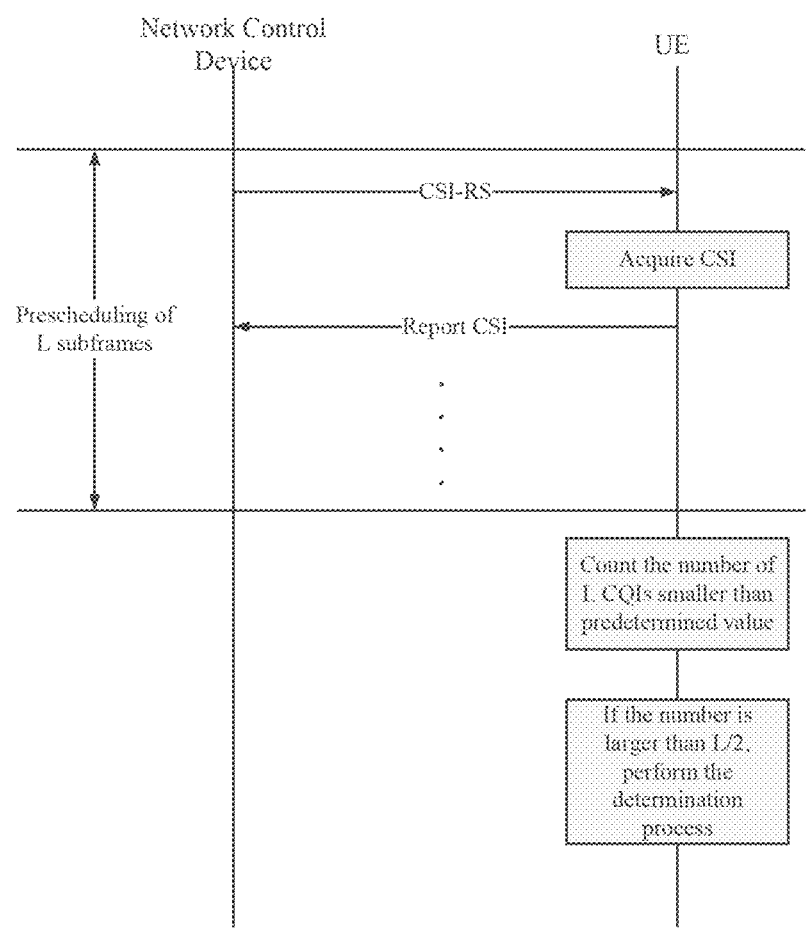
FIG. 4C illustrates an example of a pre-determination process according to the first embodiment of the present disclosure.

FIG. 4C illustrates a signaling flowchart of an example of the pre-determination process during a pre-scheduling of the multi-user communication according to the first embodiment, in which the prescheduling means that the network control device of a communication system tests different scheduling solutions for the multi-user communication so as to find the optimum one, including the optimum allocation of communication resources (e.g. time and frequency resources) or the like.

As illustrated in FIG. 4C, the prescheduling of the multi-user communication such as the MU MIMO takes place in a period of L subframes. During each prescheduling, the network control device allocates CSI-RS resources to the user device, and the user device can measure CQI under the current scheduling solution by using the allocated CSI-RS resources.

After the completion of the L preschedulings, the user device can obtain L CQIs. Then the user device can count the number of CQIs which are smaller than a predetermined value, among the L CQIs. If the CQIs smaller than the predetermined value exceed a certain number, for example, exceed L/2 (here L/2 is just an example, and the number can be any other appropriate number), it can be assumed that the overall channel quality during the entire prescheduling is not satisfactory, and there is a possibility that: in the multi-user communication performed formally later, severe inter-user interferences are likely to occur even in accordance with the optimum scheduling solution. In this case, based on the result of the pre-determination process, the determination process as shown in FIG. 4A or 4B can be performed, so as to reach a final determination of whether there is a need to change the type of channel state feedback.

If CQIs smaller than the predetermined value do not exceed L/2, it can be assumed that the scheduling solution for the multi-user communication in question will not bring severe inter-user interferences, and it is not necessary to perform the determination process as shown in FIG. 4A or 4B, so as to reduce processing overhear or signaling overhead.

By performing the pre-determined process as described above, the determination process regarding whether there is a need to change the type of channel state feedback can be reduced, especially in the case where the scheduling solution of the multi-user communication will not bring large channel interferences.

1.4 Notifying Process According to the First Embodiment

As described in the above section, the notifying unit 204 of the electronic device 200 can notify the determination result made by the determining unit 203 regarding changing the type of channel state feedback to the network control device (e.g. the electronic device 300). The notifying can be implemented by transmitting information indicating the category of the second type of channel state feedback.

In one example, the indicative information CSI_TYPE_Flag on the category of the second type of channel state feedback can be included in an uplink signaling message, for example, the uplink control information (UCI) transmitted via PUCCH or PUSCH, or the CSI packet transmitted via PUSCH. Preferably, the indicative information CSI_TYPE_Flag can be included in the UCI, for example, in a field of the UCI that is unused at present, or in a newly added field of the UCI (e.g. a newly added portion at the beginning, at the middle, at the end of the UCI).

Alternatively, the indicative information CSI_TYPE_Flag can be included in a newly defined uplink signaling message find transmitted via PUCCH or PUSCH to the network control device. The uplink signaling message has at least a field containing the indicative information CSI_TYPE_Flag.

After receiving the signaling message containing the indicative information CSI_TYPE_Flag, the network control device can learn which type of channel state feedback is to be performed, for allocating corresponding CSI-RS resources.

The indicative information CSI_TYPE_Flag can be represented by only a few bits.

In one example, the indicative information CSI_TYPE_Flag can be represented by 1 bit, for example, when CSI_TYPE_Flag=0, it means the channel state feedback with a low accuracy is to be performed, and only channel state information such as CQI, PMI, CRI or the like will be reported, and when CSI_TYPE_Flag=1, it means a more accurate channel state feedback is to be performed, for example, the precoded feedback based on linearly combined codebook, the feedback for covariance matrix, the hybrid CSI feedback or the like. After receiving the indicative information CSI_TYPE_Flag=1, the network control device can decide which type of channel state feedback on its own and allocate corresponding CSI-RS resources, as long as the accuracy of CSI is improved.

In a preferred example, the indicative information CSI_TYPE_Flag can be represented by 2 bits, for example, as shown in the following table:

TABLE 1 correspondence of the bit value and the indicative information

| | Bit value | | | |
|---|---|---|---|---|
| | 00 | 01 | 10 | 11 |
| Indication info. | Conventional channel state feedback | Precoded feedback based on linearly combined codebook | Covariance matrix feedback | Hybrid CSI feedback |

Note that, the above table is only illustrative, and the correspondence of the bit value and the indicative information is not limited thereto.

In another example, the indicative information CSI_TYPE_Flag can be represented by more than 2 bits, to possess a feasibility of being compatible with more categories of the channel state feedback.

1.5 Application Example According to the First Embodiment

Aspects of the first embodiment have been described above, and hereinafter description will be given to the application example under the MU MIMO communication scenario with reference to FIG. 5. Although this application example takes MU MIMO communication scenario into account, but it is also applicable to other multi-user communication scenarios.

Before the start of the MU MIMO communication, the user device can measure a receiving power of non-zero-power CSI-RS, i.e., reference signal receiving power (RSRP), and only when the RSRP is larger than a threshold P', P' being a maximum of the RSRPs of users at edge of a cell, it can be assumed that the user device is not at edge of the cell, and the MU MIMO communication can be performed.

Figure 5:
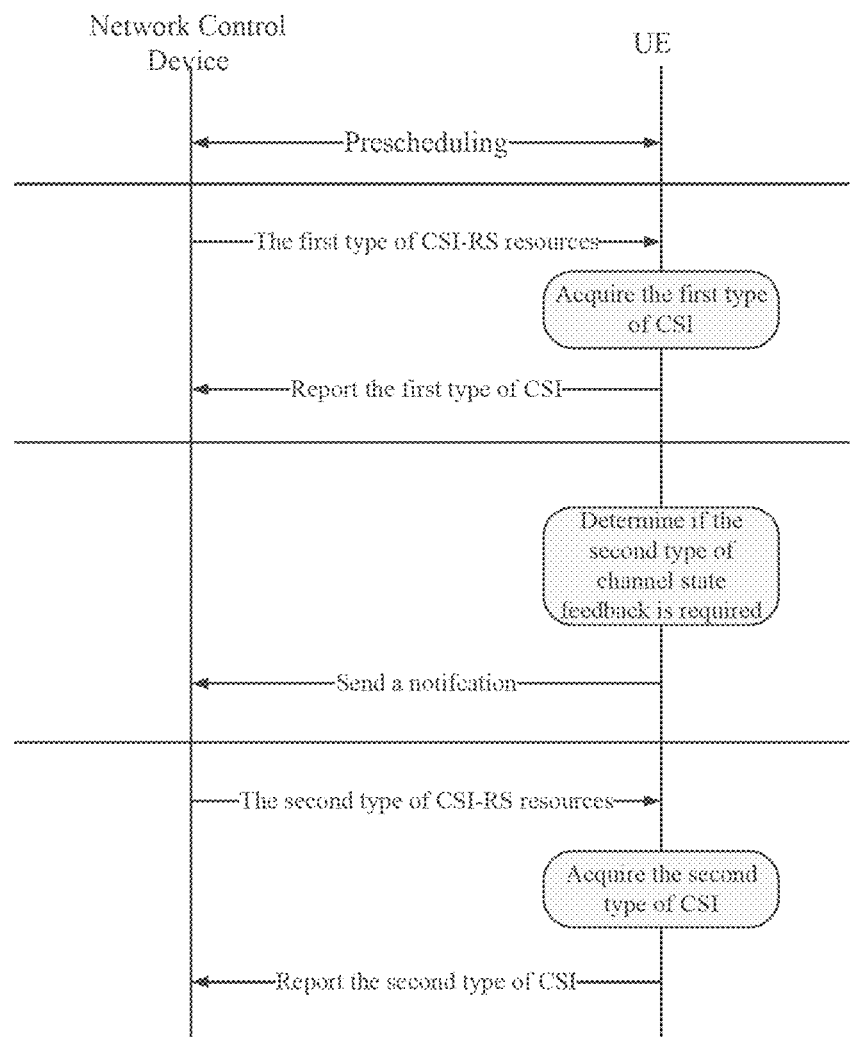
FIG. 5 illustrates a communication procedure when the first embodiment of the present disclosure is applied to the MU MIMO scenario.

After determining the user device can perform the MU MIMO communication, the network control device can perform prescheduling for the user device and other user devices which are close geographically to each other, so as to determine an optimum scheduling solution of the MU MIMO for these user devices, as shown in FIG. 5.

After the completion of the pre-scheduling, the network control device can implement the MU MIMO transmission according to the optimum scheduling solution.

During the MU MIMO transmission, the network control device can allocate the first type of CSI-RS resources to the use device, and the user device acquires the first type of CSI using the CSI-RS resources and reports the acquired CSI to the network control device for use.

Meanwhile, the user device can perform the determination process regarding whether there is a need to perform the second type of channel state feedback. For example, the user device can perform the determination process as shown in FIG. 4A or 4B, or alternatively, can perform the pre-determination process as shown in FIG. 4C at first, and then perform the determination process as shown in FIG. 4A or 4B. When the user device has determined that there is a need to change the type of the channel state feedback and determine the specific category of the channel state feedback, a notification including the determination result can be generated and sent to the network control device, for example by using the notifying process as described above in the Section 1.4.

The network control device, after receiving the notification, can learn the category of the channel state feedback to be performed, and allocate the second type of CSI-RS resources to the user device. Simultaneously with allocating the second type of CSI-RS resources, the network control device can stop allocating the first type of CSI-RS resources. Alternatively, the network control device can continue to allocate the first type of CSI-RS resources while allocating the second type of CSI-RS resources.

Then, the user device can use the second type of CSI-RS resources to acquire the second type of CSI, and report the acquired second type CSI to the network control device. While reporting the second type of CSI, the user device may stop reporting the first type of CSI in response to the network control device stopping allocation of the first type of CSI-RS resources, or alternatively, can continue to report the first type of CSI in response to the network control device continuing allocation of the first type of CSI-RS resources.

2. The Second Embodiment

In the first embodiment as described above, the determination process regarding whether there is a need to change the type of channel state feedback is performed on the side of user, but the determination process can also be performed on the side of network control.

The second embodiment of the present disclosure will be described with reference to the drawings. The following description focuses on different portions from the first embodiment, and the description of the same portions will be omitted or simplified.

2.1 The Electronic Device on the Side of Network Control and Its Communication Method According to the Second Embodiment The electronic device 600 on the side of network control and its communication method according to the second embodiment will be described below with reference to FIG. 6A and FIG. 6B.

Figure 6A:
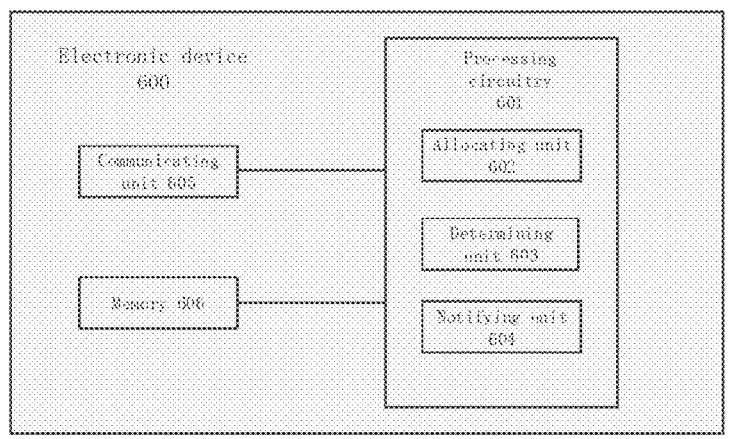
FIG. 6A is a block diagram illustrating an electronic device on the side of network control according to a second embodiment of the present disclosure.

FIG. 6A is a block diagram illustrating the electronic device 600 according to the second embodiment. The electronic device 600 is a base station such as eNB in the 4G communication standard or gNB in the 5G communication standard, or a communication means performing similar functionalities. The electronic device 600 includes at least a processing circuitry 601. The processing circuitry 601 provides various functionalities of the electronic device 600. For example, the processing circuitry 601 can include an allocating unit 602, a determining unit 603 and a notifying unit 604.

The allocating unit 602 of the electronic device 600 is configured to allocate resources for channel state feedback to a user device (e.g. the electronic device 700 as described below) depending to the type of the channel state feedback. The resources for channel state feedback can be various downlink reference signals or pilot signal, such as CRS, CSI-RS or the like. The allocating unit 602 can allocate reference signals for different types of channel state feedback. For example, the allocating unit 602 can allocate CSI-RS resources periodically, for the user device to measure conventional CSI such as CQI, PMI, RI and the like. However, if the determining unit 603 as described below determines that an enhanced channel state feedback is to be performed, the resources for the enhanced channel state feedback can be allocated by the allocating unit 602.

The determining unit 603 of the electronic device 600 is configured to determine whether there is a need to change the type of the channel state feedback. The determining unit 603 can perform such determination process based on various factors, including requirements a communication service has on the content or accuracy of the CSI, channel interferences such as inter-user interferences, overhead on the processing and transmission of CSI, or the like. In the present disclosure, assuming that the current channel state feedback is of a first type and is used to report the first type of CSI. The determining unit 603 can determine a second type of channel state feedback is to be used to report the second type of CSI. The determining unit 603 further determines the specific category of the second type of channel state feedback.

The notifying unit 604 is configured to notify the user device (for example, the electronic device 700 as described below) of the determination result made by the determining unit 603. The notifying unit 604 can perform the notifying by generating a message including the determination result and send it to the user device. For example, the determination result can be included in downlink control information (DCI) signaling transmitted via physical downlink control channel (PDCCH), or can be included in a newly defined downlink signaling message to be transmitted to the user device via the PDCCH. The information on the determination result may indicate the specific category of the channel state feedback which is desired to be performed next, and thus the network control device can know which channel state feedback is to be performed next upon receiving the notification issued by the notifying unit 604, and can acquire and report the second type of CSI by employing corresponding resources to (e.g. CSI-RS) for channel state feedback.

The electronic device 600 can further include a communication unit 605 and a memory 606.

The communication unit 605 of the electronic device 600 can be configured to communicate with the user device under control of the processing circuitry 601. The communication unit 605 can be implemented as a transceiver. In one example, the communication unit 605 can be implemented as a communication interface component of an antenna device, a radio frequency circuit, and the like. The communication unit 605 is depicted with broken lines, since it can also reside within the processing circuitry 601 or outside the electronic device 600.

The memory 606 of the electronic device 600 can store various information generated by the processing circuitry 601, program or data used by the electronic device 600 to operate, data or information to be transmitted by the communication unit 605. The memory 606 is depicted by broken lines, since it can also reside within the processing circuitry 601 or outside the electronic device 300. The memory 606 can be a volatile memory and/or a non-volatile memory. For example, the memory 606 can include but is not limited to a random access memory (RAM), a dynamic random access memory (DRAM), a static random access memory (SRAM), a read only memory (ROM), a flash memory.

The communication method performed by the electronic device 600 will be described below with reference to FIG. 6B.

Figure 6B:
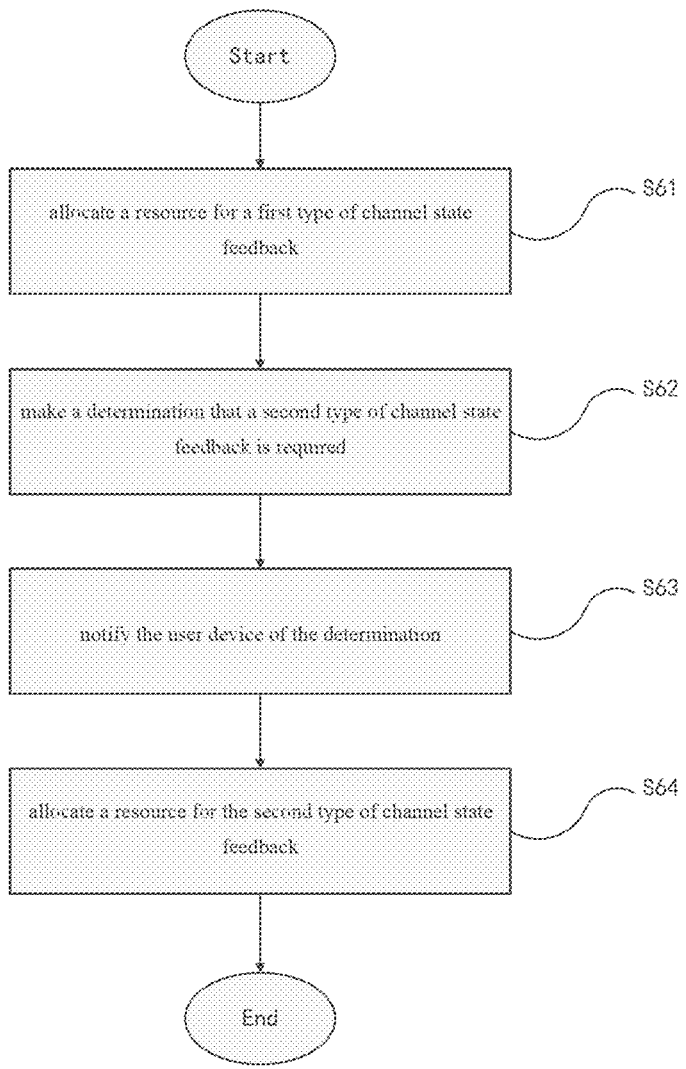
FIG. 6B is a signaling flowchart of a communication method performed by the electronic device on the side of network control according to the second embodiment of the present disclosure.

As shown in FIG. 6B, in step S61, the allocating unit 602 of the electronic device 600 allocates resources for the first type of channel state feedback to the user device. For example, in one example, the network control device can allocate periodic CSI-RS resources to the user device (e.g. the electronic device 700 as described below), for the user device to report periodically channel state information such as CQI, PMI, RI or the like.

Then in step S62, the determining unit 602 of the electronic device 600 determines whether to perform the second type of channel state feedback, wherein the second type is different from the first type. The determination process can be performed based on various factors, and examples of the determination process will be described in detail later in the following Section 2.3. If the determining unit 603 determines that the second type of channel state feedback is to be performed, the determination result and information on the specific category of the second type of channel state feedback are presented to the notifying unit 604. If the determining unit 603 determines that the type of the channel state feedback needs not to be changed, the reporting unit 602 will continue to perform the first type of channel state feedback.

In step S63, the notifying unit 604 of the electronic device 600 notifies the user device of the determination result made by the determining unit 603. Such notifying process can be implemented by generating and transmitting a message including the specific category of the second type of channel state feedback. Specific examples of the notifying process will be described in the following Section 2.4.

Next, in step S64, the allocating unit 602 of the electronic device 600 can start allocating the resources for the second type of channel state feedback, based on the determination result made by the determining unit 603, such the user device can acquire and report the second type of CSI.

2.2 The Electronic Device on the Side of User and Its Communication Method According to the Second Embodiment The electronic device 700 on the side of user and its communication method according to the second embodiment will be described below with reference to FIGS. 7A and 7B.

Figure 7A:
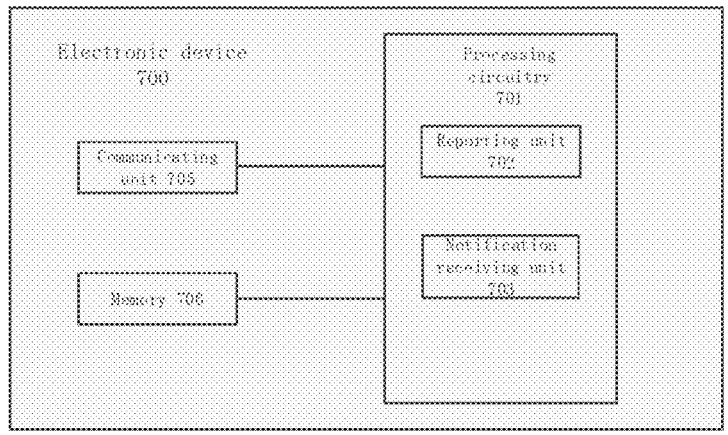
FIG. 7A is a block diagram illustrating an electronic device on the side of user according to a first embodiment of the present disclosure.

FIG. 7A is a block diagram illustrating the electronic device 700 according to the second embodiment. The electronic device 200 is a user device such as a mobile phone, an in-vehicle device, a tablet or the like or its element. As illustrated in FIG. 7A, electronic device 700 includes at least a processing circuitry 701. The processing circuitry 701 of the electronic device 700 provides various functionalities of the electronic device 200. For example, the processing circuitry 701 can include a reporting unit 702 and a notification receiving unit 703.

The reporting unit 702 is configured to acquire and report CSI by using a resource for channel state feedback allocated by the network control device (e.g. the electronic device 600 as described above). The reporting unit 702 may perform the channel state feedback in many manners. For example, the reporting unit 702 may perform the channel state feedback in an implicit manner, that is, report to the network control device information characterizing the channel state, such as CQI, PMI, RI, CRI or the like. Alternatively, the reporting unit 702 can perform an explicit reporting, including the precoded feedback based on linearly combined codebook, the feedback for channel covariance matrix, the hybrid CSI feedback or the like.

The notification receiving unit 703 of the electronic device 700 is configured to receive the notification regarding whether it is required to perform another type of channel state feedback from the network control device. This notification can include information on the specific category of the channel state feedback to be performed by the electronic device 700, and based on this information, the reporting unit 702 of the electronic device 700 can report corresponding CSI, for use by the network control device, for example, for use in performing resource scheduling or precoding.

The electronic device 700 can further include a communication unit 705 and a memory 706.

The communication unit 705 of the electronic device 700 can be configured to communicate with the user device under control of the processing circuitry 701, so as to transmit CSI or the like to the network control device. The communication unit 705 can be implemented as a transmitter or transceiver. In one example, the communication unit 705 can be implemented as a communication interface component of an antenna device, a radio frequency circuit, and the like. The communication unit 705 is depicted with broken lines, since it can also reside within the processing circuitry 701 or outside the electronic device 700.

The memory 706 of the electronic device 700 can store various information generated by the processing circuitry 701, program or data used by the electronic device 700 to operate, data or information (e.g. CSI) to be transmitted by the communication unit 705. The memory 706 is depicted by broken lines, since it can also reside within the processing circuitry 701 or outside the electronic device 700. The memory 706 can be volatile memory and/or non-volatile memory. For example, the memory 706 can include but is not limited to a random access memory (RAM), a dynamic random access memory (DRAM), a static random access memory (SRAM), a read only memory (ROM), a flash memory.

Figure 7B:
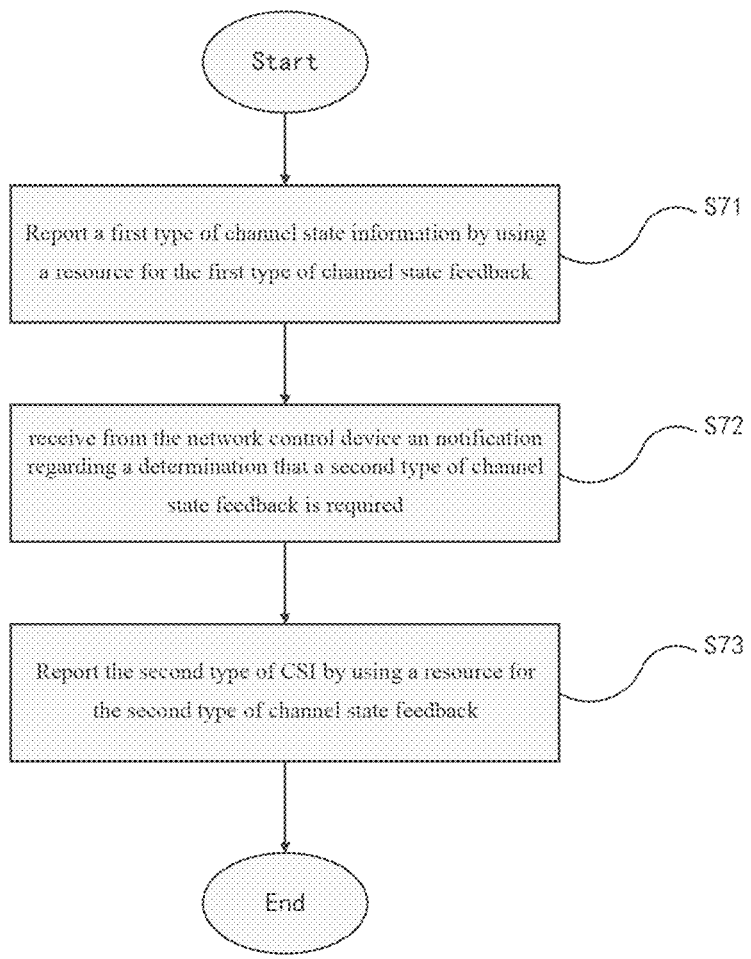
FIG. 7B is a signaling flowchart of a communication method performed by the electronic device on the side of user according to the second embodiment of the present disclosure.

FIG. 7B illustrates the communication method performed by the electronic device 700 on the side of user.

As illustrated in FIG. 7B, in step S71, the reporting unit 702 of the electronic device 700 can report the first type of CSI by using the resources for the first type of channel state feedback allocated by the network control device. The type of the channel state feedback performed by the reporting unit 702 is associated with the resource allocated by the network control device. For example, in one example, the network control device can allocate periodic CSI-RS resources to the electronic device 700, such that the reporting unit 702 can measure for example CQI, parameters related to the channel matrix or the like by using the CSI-RS resources, and periodically report the CSI to the network control device.

In step S72, the notification receiving unit 703 of the electronic device 700 receives from the network control device the notification that there is a need to perform the second type of channel state feedback. Information included in the notification is extracted, and thus the indicative information on the specific category of the second type of channel state feedback can be obtained.

In step S73, based on the indicative information extracted from the notification, the reporting unit 702 of the electronic device 700 performs the second type of channel state feedback, and reports the acquired CSI to the network control device.

2.3 The Determination Process According to the First Embodiment

In the first embodiment of the present disclosure, the determination process of determining whether there is a need to perform another channel state feedback of the type different from that of the current channel state feedback is done at the device on the side of network control (e.g. the electronic device 600). The determination process can be performed in consideration of various factors. For purpose of illustration, an example of such determination process implemented in the multi-user communication scenario is described in detail below. As used herein, the multi-user communication for example is the MU MIMO communication.

In the MU MIMO communication, depending on the orthogonality between the layers used by respective user devices, there is inter-layer interference to some extent. When the inter-layer interference is severe, the performance of transmission of the MU MIMO communication is reduced, which may cause the accuracy of the CSI to decrease. By evaluating such inter-layer interference, it can be decided whether the current channel state feedback meets the need or not.

2.3.1 Determination Process Based on the Orthogonality Between Communication Resources As explained in the above Section 1.3.1, the determination process regarding whether there is a need to change the type of the channel state feedback can be performed based on the orthogonality between the communication resources used by the user devices.

In one example, the orthogonality can be decided based on demodulation reference signal (DMRS) ports corresponding to layers of respective user devices, wherein the DMRS ports can be indicated by corresponding scrambling code sequences. The orthogonality between layers used by different user devices may be decided by evaluating a correlation degree between the scrambling code sequences of respective DMRS ports.

Figure 8A:
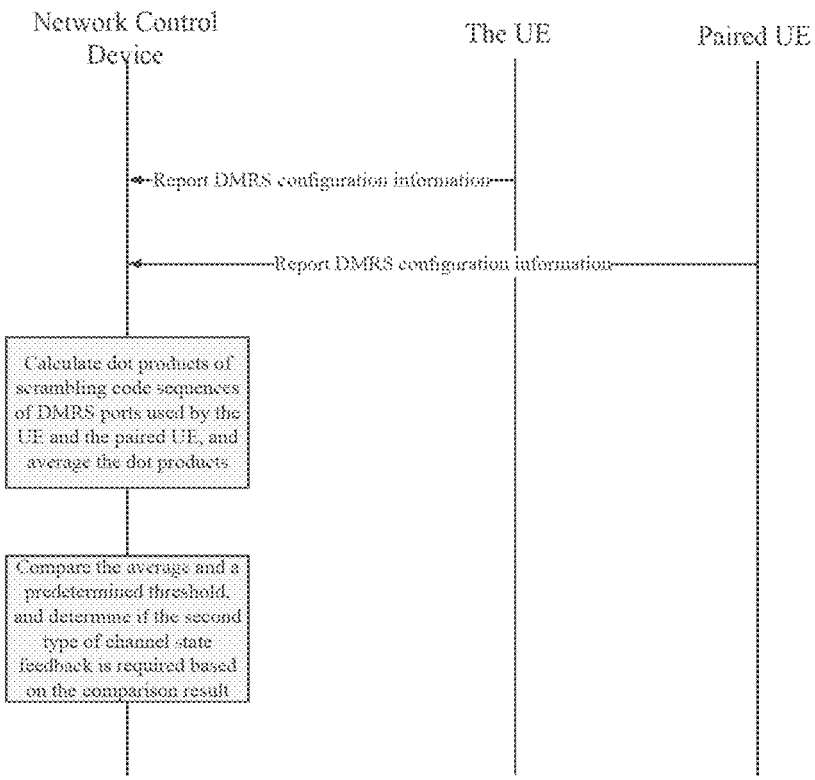
FIG. 8A illustrates an example of the determination process according to the second embodiment of the present disclosure.

FIG. 8A is signaling flowchart of an example of the determination process based on DMRS configuration information.

First, as shown by the dotted arrow, the present user device (the user device performing the communication method according to the second embodiment) and other paired user devices involved in the multi-user communication report the DMRS configuration information to the network control device, after the DMRS configurations are determined. The DMRS configuration information reported by the user device can include: the DMRS port number of the user device, the scrambling code sequence number, the cell number, the time-frequency mapping location, and the like. Such reporting process can be completed during a prescheduling for the multi-user communication, and the DMRS configuration information reported by all user devices are saved at the network control device.

Then, the network control device can evaluate the orthogonality between the communication resources used by respective user devices based on the DMRS configuration reported by the user devices. The network control device can decide the correlation degree between the scrambling code sequences of m (m≥1) DMRS ports of the present user device and the scrambling code sequences of DMRS ports (n in total, n≥1) or other paired user devices.

For example, a dot product of the scrambling code sequence of each DMRS port of the present user device and the scrambling code sequence of each DMRS port of other paired user devices can be calculated, and m×n dot products can be obtained in total. In one example, an average can be calculated for the m×n dot products, and the average indicates an overall correlation degree between the scrambling code sequences. Then, the average is compared with a predetermined threshold, and when the average is larger than the predetermined threshold, it can be assumed that the overall correlation degree between the scrambling code sequences of DMRS ports used by the present user device and by the other paired user devices is high, that is, the orthogonality between the layers used by the present user device and by the other paired user devices is bad, and it is apt to cause severe inter-layer interferences, and accordingly, the present user device (e.g. the determining unit 603 of the electronic device 600) can determine there is a need to use the channel state feedback with a higher accuracy. When the average is smaller or equal to the predetermined threshold, it can be assumed that the orthogonality between the layers used by the present user device and by the other paired user devices is good, and it is not apt to cause severe inter-layer interferences, and accordingly, the present user device (e.g. the determining unit 603 or the electronic device 600) can determine there is no need required to use the channel state feedback with a higher accuracy.

Alternatively, an average can be calculated for a subset of the m×n dot products, so as to judge the correlation degree between the scrambling code sequences for a single DMRS port of the present user device, such that it is determined there is a need to use a more accurate channel state feedback, as long as a certain layer of the present user device is apt to be interfered.

Although an approach of deciding the correlation degree of scrambling code sequences by calculating the dot product of two scrambling code sequences is described above, other approaches can be used, for example, by calculating a cosine similarity, an Euclidean distance or the like between two scrambling code sequences.

2.3.2 Determination Process Based on the Degradation Degree of Channel Quality In determining if there is a need to perform another type of channel state feedback or not, it can be based on the degradation degree of channel quality of the channel between the user device and the network control device, in addition to being based on the orthogonality between communication resources used by the user device.

Figure 8B:
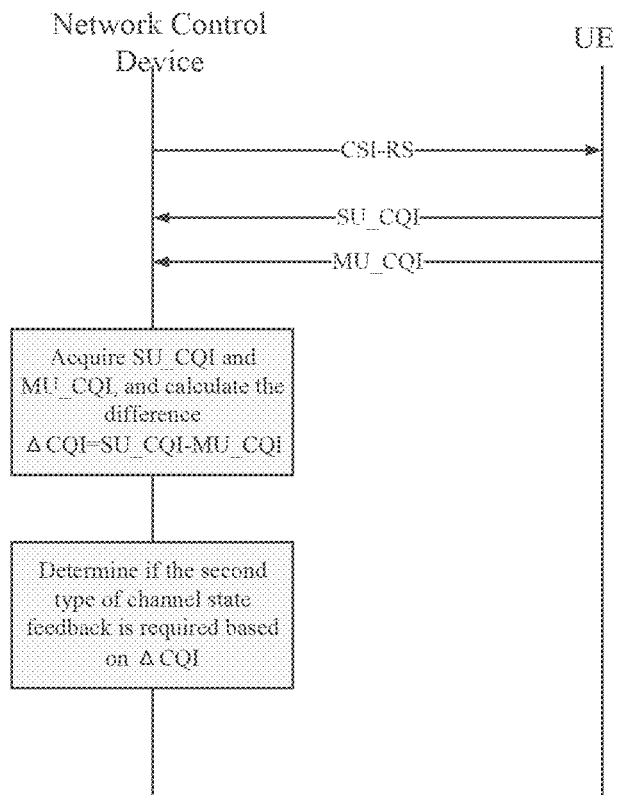
FIG. 8B illustrates another example of the determination process according to the second embodiment of the present disclosure.

FIG. 8B illustrates a signaling flowchart of an example of the determination process based on the degradation degree of channel quality.

First, during the multi-user communication involving the user device, such as the MU MIMO, the network control device allocates CSI-RS resources for channel state feedback to the user device, and the user device can acquire the CSI including CQI, based on the CSI-RS resources. The CQI acquired at this time indicates a channel quality during the multi-user communication of the user device, and is denoted as MU_CQI.

Thereafter, the network control device can calculate a difference between the MU-CQI and a CQI acquired during a single-user communication before the multi-user communication, $\Delta CQI=Su\_CQI-MU\_CQI$, wherein $\Delta CQI$ indicates the degradation degree of the channel quality of the user device during the multi-user communication due to inter-user interferences, relative to the channel quality during the single-user communication.

Then, the network control device can determine whether there is a need to use another type of channel state feedback based on $\Delta CQI$. For example, if $\Delta CQI$ is larger than a predetermined threshold, it can be assumed that the channel quality may be degraded enough to affect the accuracy of channel state feedback, and accordingly the user device (e.g. the determining unit 603 of the electronic device 600) may determine whether there is a need to use a more accurate channel state feedback. On the contrast, if $\Delta CQI$ is not larger than the predetermined threshold, it can be assumed that the channel quality has not been degraded enough to affect the accuracy of the channel state feedback, and accordingly, the user device may determine there is no need to change the type of channel state feedback.

2.3.3 Pre-Determination Process

In the second embodiment, during determining whether there is a need to perform another type of channel state feedback, in addition to performing the determination process as in FIG. 8A or FIG. 8B, the pre-determination process can be performed at first, and then the determination process as in FIG. 8A or FIG. 8B is performed. Wherein the pre-determination process aims at coarsely evaluating the current channel state, so as to decide whether it is necessary to perform the subsequent determination process.

Figure 8C:
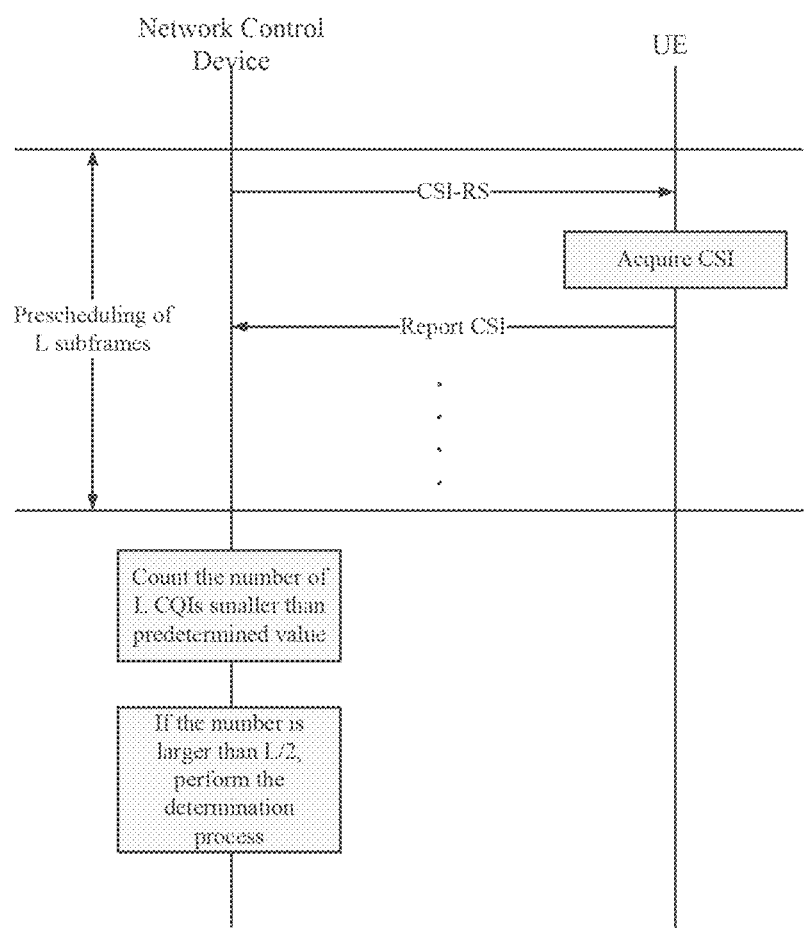
FIG. 8C illustrates an example of the pre-determination process according to the second embodiment of the present disclosure.

FIG. 8C illustrates a signaling flowchart of an example of the pre-determination process during a prescheduling of the multi-user communication according to the second embodiment.

As illustrated in FIG. 8C, the prescheduling of the multi-user communication such as MU MIMO takes place in a period of L subframes. During each prescheduling, the network control device allocates CSI-RS resources to the user device, and the user device can measure CQI under the current scheduling solution by employing the allocated CSI-RS resources.

After the completion of L preschedulings, the user device can obtain L CQIs. Then the user device can count the number of CQIs which are smaller than a predetermined value, among the L CQIs. If the CQIs smaller than the predetermined value exceed a certain number, for example, exceed L/2 (here L/2 is just an example, and the number can be any other appropriate number), it can be assumed that the overall channel quality during the entire pre-scheduling is not satisfactory, and there is a possibility that: in the multi-user communication performed formally later, several inter-user interferences are likely to occur even in accordance with the optimum scheduling solution. In this case, based on the result of the pre-determination process, the determination process as shown in FIG. 8A or 8B can be performed, so as to reach a final determination of whether there is a need to change the type of channel state feedback.

If CQIs smaller than the predetermined value do not exceed L/2, it can be assumed that the scheduling solution for the multi-user communication in question will not bring severe inter-user interferences, and it is not necessary to perform the determination process as shown in FIG. 8A or 8B, so as to reduce processing overhear or signaling overhead.

By performing the pre-determined process as described above, the determination process regarding whether there is a need to change the type of channel state feedback can be reduced, especially in the case where the scheduling solution of the multi-user communication will not bring large channel interferences.

2.4 Notification Process According to the First Embodiment

As described in the above sections, the notifying unit 604 of the electronic device 600 can notify the determination result made by the determining unit 603 regarding changing the type of channel state feedback to the user device (e.g. the electronic device 700). The notifying can be implemented by transmitting information indicating the category of the second type of channel state feedback.

In one example, the indicative information CSI_TYPE_Flag on the category of the second type of channel state feedback can be included in a downlink signaling message, for example, the downlink control information (DCI) transmitted via the PDCCH. Preferably, the indicative information CSI_TYPE_Flag can be included in the DCI, for example, in a field of the DCI that is unused at present, or in a newly added field of the DCI (e.g. a newly added portion at the beginning, at the middle, at the end of the DCI).

Alternatively, the indicative information CSI_TYPE_Flag can be included in a newly defined downlink signaling message.

After receiving the signaling message containing the indicative information CSI_TYPE_Flag, the user device can learn which type of channel state feedback is to be performed, and perform the channel state feedback by using corresponding CSI-RS resources allocate by the network control device.

With respect to the indicative information CSI_TYPE_Flag, it can be represented by several bits. The representations for the indicative information CSI_TYPE_Flag have been described in the above Section 1.4, and detailed description thereof will be omitted here.

2.5 Application Example According to the Second Embodiment

Aspects of the second embodiment have been described above, and hereinafter description will be given to the application example under the MU MIMO communication scenario with reference to FIG. 9. Although this application example takes the MU MIMO communication scenario into account, but it is also applicable to other multi-user communication scenario.

Before the start of the MU MIMO communication, the user device can measure a receiving power of non-zero-power CSI-RS, i.e., reference signal receiving power (RSRP), and only when the RSRP is larger than a threshold P', wherein P' is a maximum of the RSRPs of users at edge of a cell, it can be assumed that the user device is not at edge of the cell, and the MU MIMO communication can be performed.

Figure 9:
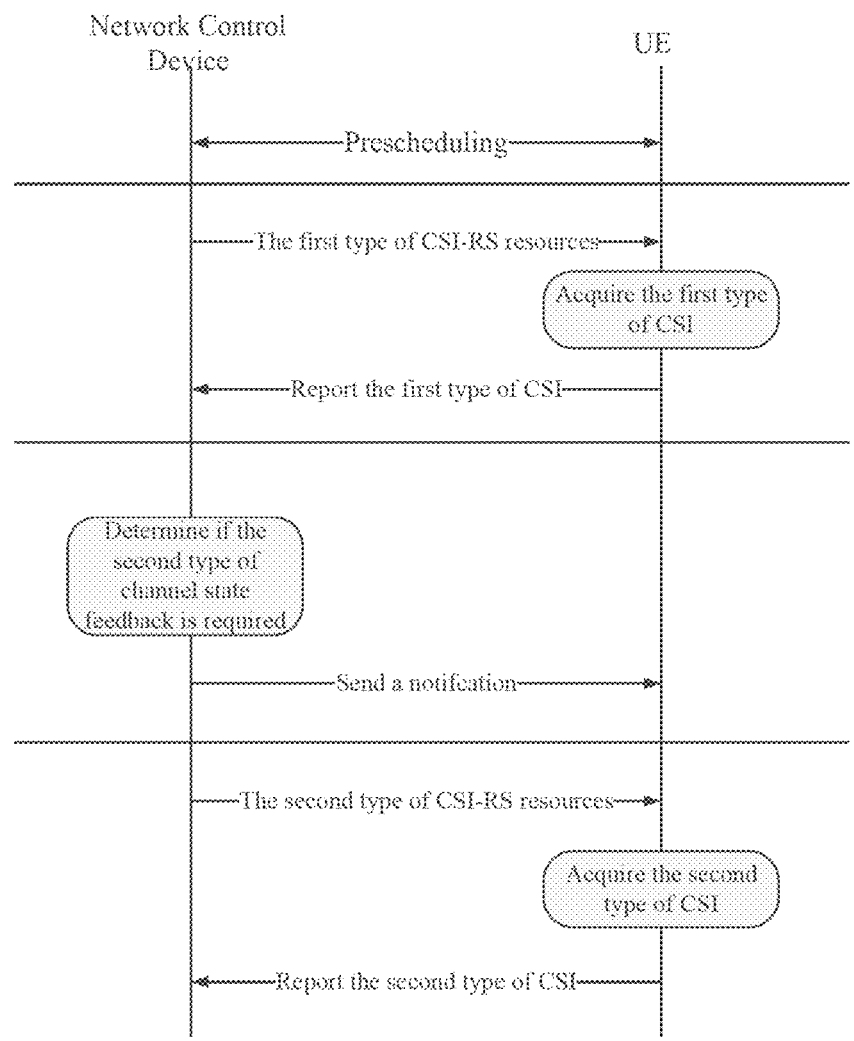
FIG. 9 illustrates a communication procedure when the second embodiment of the present disclosure is applied to the MU MIMO scenario.

After determining the user device can perform the MU MIMO communication, the network control device can perform a prescheduling for the user device and other user devices which are close geographically to each other, so as to determine an optimum scheduling solution of the MU MIMO for these user devices, as shown in FIG. 9.

After the completion of the pre-scheduling, the network control device can carry out the MU MIMO transmission according to the optimum scheduling solution.

During the MU MIMO transmission, the network control device can allocate the first type of CSI-RS resources to the use device, and the user device acquires the first type of CSI using the CSI-RS resources and reports the acquired CSI to the network control device for use.

Meanwhile, the network control device can perform the determination process regarding whether it is required to perform the second type of channel state feedback. For example, the user device can perform the determination process as shown in FIG. 8A or 8B, or alternatively, can perform the pre-determination process as shown in FIG. 8C at first, and then perform the determination process as shown in FIG. 8A or 8B. When the network control device has determined that it is required to change the type of the channel state feedback and determine the specific category of the channel state feedback, the determination result can be notified to the user device, for example by using the notifying process as described above in the section 2.4.

The user device, after receiving the notification, can learn the category of the channel state feedback to be performed, and acquire the second type of CSI by using the second type of CSI-RS resources allocated by the network control device. Simultaneously with reporting the second type of CSI-RS resources, the network control device can stop reporting the first type of CSI in response to the network control device stopping the allocation of the first type of CSI-RS resources. Alternatively the user device can continue to report the first type of CSI in response to the network control device continuing allocating the first type of CSI-RS resources.

3. Application Example of the Present Application

Technology according the present application is applicable to various products.

For example, the electronic device 300 or 600 according to the embodiments of the present disclosure may be implemented as various network control devices or stalled in various network control devices, and the electronic device 200 or 700 according to the embodiments of the present disclosure may be implemented as various user devices or stalled in various user devices, or the communication methods according to the embodiments of the present disclosure can be implemented by various network control devices or user devices.

The network control device may be implemented as any type of base stations, preferably, such as the macro gNB or the small gNB in the NR (New Radio) access technology of the 3GPP 5G communication standard. A small gNB may be an gNB that covers a cell smaller than a macro cell, such as a pico gNB, micro gNB, and home (femto) gNB. Instead, the network control device may be implemented as any other types of base stations such as a NodeB, eNodeB and a base transceiver station (BTS). The network control device may include a main body (that is also referred to as a base station device) configured to control wireless communication, and one or more remote radio heads (RRH) disposed in a different place from the main body.

The user device may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The user device may also be implemented as a terminal (that is also referred to as a machine type communication (MTC) terminal) that performs machine-to-machine (M2M) communication. Furthermore, the user device may be a wireless communication module (such as an integrated circuit module including a single die) mourned on each of the above terminals.

3.1 Applications Related to Electronic Device on the Side of Control Device

It will be appreciated that as used in the present disclosure, the term "network control device" or "base station" has the entire breadth in its generic sense, and includes at least the wireless communication station used for a portion of a wireless communication system or a radio system for purpose of communication. Examples of the base station can be for example but is not limited to the following: the base station can be either or both of the base transceiver station (BTS) and the base station controller (BSC) in the GSM system, can be either or both of the radio network controller (RNC) or NodeB in the WCDMA system, can be eNB in the LTE and LTE-Advanced system, or can be corresponding network nodes in future communication systems (for example, the gNB possibly appearing in the 5G communication system, or the like). In communication scenarios such as D2D, M2M and V2V, a logical entity having a control function over the communication can be referred to a base station. In the scenario of cognitive radio communication, a logical entity having a function of frequency spectrum coordination can also be referred to a base station.

First Application Example

Figure 10:
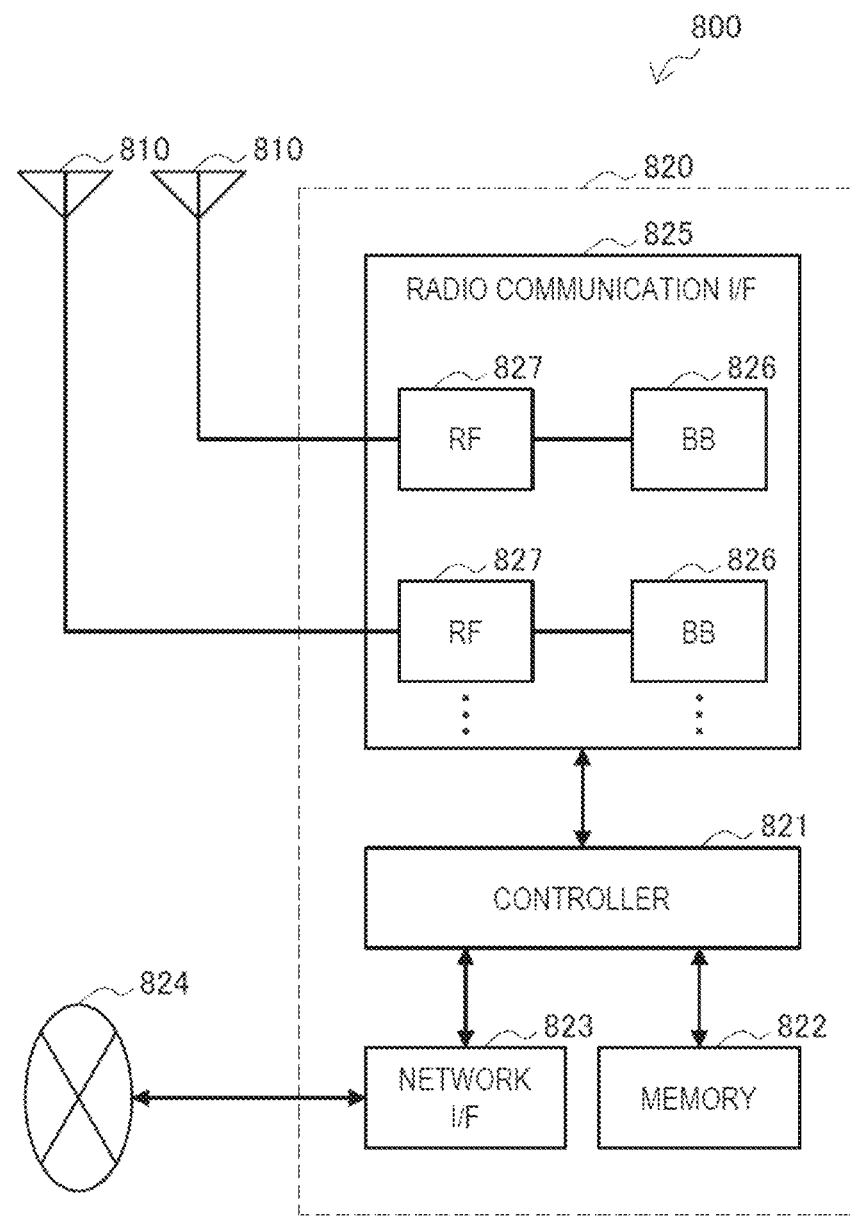
FIG. 10 is a block diagram illustrating a first example of the electronic device on the side of network control according to embodiments of the present disclosure.

FIG. 10 is a block diagram illustrating a first example of a schematic configuration of the network control device to which a technology of the present application may be applied. The network control device may include for example the electronic device 300 or 600 for downlink transmission. In FIG. 10, the network control device is illustrated as an gNB 800. The gNB 800 includes a plurality of antennas 810 and a base station device 820. The base station device 820 and each antenna 810 may be connected with each other via a RF cable.

The antennas 810 may include one or more antenna arrays, which includes multiple antenna elements (such as multiple antenna elements included in a Multiple Input and Multiple Output (MIMO) antennas), and is used for the base station 820 to transmit and receive radio signals. The gNB 800 may include multiple antennas 810, as illustrated in FIG. 10. For example, multiple antennas 810 may be compatible with multiple frequency hands used by the gNB 800. FIG. 10 illustrates the example in which the gNB 800 includes multiple antennas 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 may include the processing circuitry 301 or 601 as described above, perform the communication method on the side of network control as described in the above first or second embodiment, or control the components of the electronic device 300 or 600. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an gNB or a core network node in the vicinity. The memory 822 includes RAM and ROM, and stores a program that is executed by the controller 821, and various types of control data such as a terminal list, transmission power data, and scheduling data.

The network interface 823 is a communication interface for connecting the base station device 820 to a core network 821. The controller 821 may communicate with a core network node or another gNB via the network interface 823. In that case, the gNB 800, and the core network node or the other gNB may be connected to each other through a logical interface such as an S1 interface and an X2 interface. The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the gNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers such as L1, medium access control (MAC), radio link control (RLC), and a packet data convergence protocol (PDCP). The BB processor 826 may have a part or all of the above-described logical functions instead of the controller 821. The BB processor 826 may be a memory that stores a communication control program, or a module that includes a processor configured to execute the program and a related circuit. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 10. For example the multiple BB processors 826 may be compatible with multiple frequency bands used by the gNB 800. The radio communication interface 825 may include the multiple RF circuits 827, as illustrated in FIG. 10. For example, the multiple RF circuits 827 may be compatible with multiple antenna elements. Although FIG. 10 illustrates the example in which the radio communication interface 825 includes the multiple BB processors 826 and the multiple RF circuits 827, the radio communication interface 825 may also include a single BB processor 826 or a single RF circuit 827.

In the gNB 800 illustrated in FIG. 10, one or more of the components (for example, the allocating unit 302, 602) included in the processing circuitry 301 described with reference to FIG. 3A or the processing circuitry 601 described with reference to FIG. 6A may be implemented in the radio communication interface 825. Alternatively, at least a part of these components may be implemented in the controller 821. As an example, the gNB 800 includes a part (for example, the BB processor 826) or the entire of the radio communication interface 825 and/or a module including the controller 821, and the one or more components may be implemented in the module. In this case, the module may store a program (in other words, a program causing the processor to execute operations of the one or more components) causing me processor to function as the one or more components, and execute the program. As another example, a program causing the processor to function as the one or more components may be installed in the gNB 800, and the radio communication interface 825 (for example, the BB processor 826) and/or the controller 821 may execute the program. As described above, as a device including the one or more components, the gNB 800, the base station device 820 or the module may be provided. In addition, a readable medium in which the program is recorded may be provided.

Second Application Example

Figure 11:
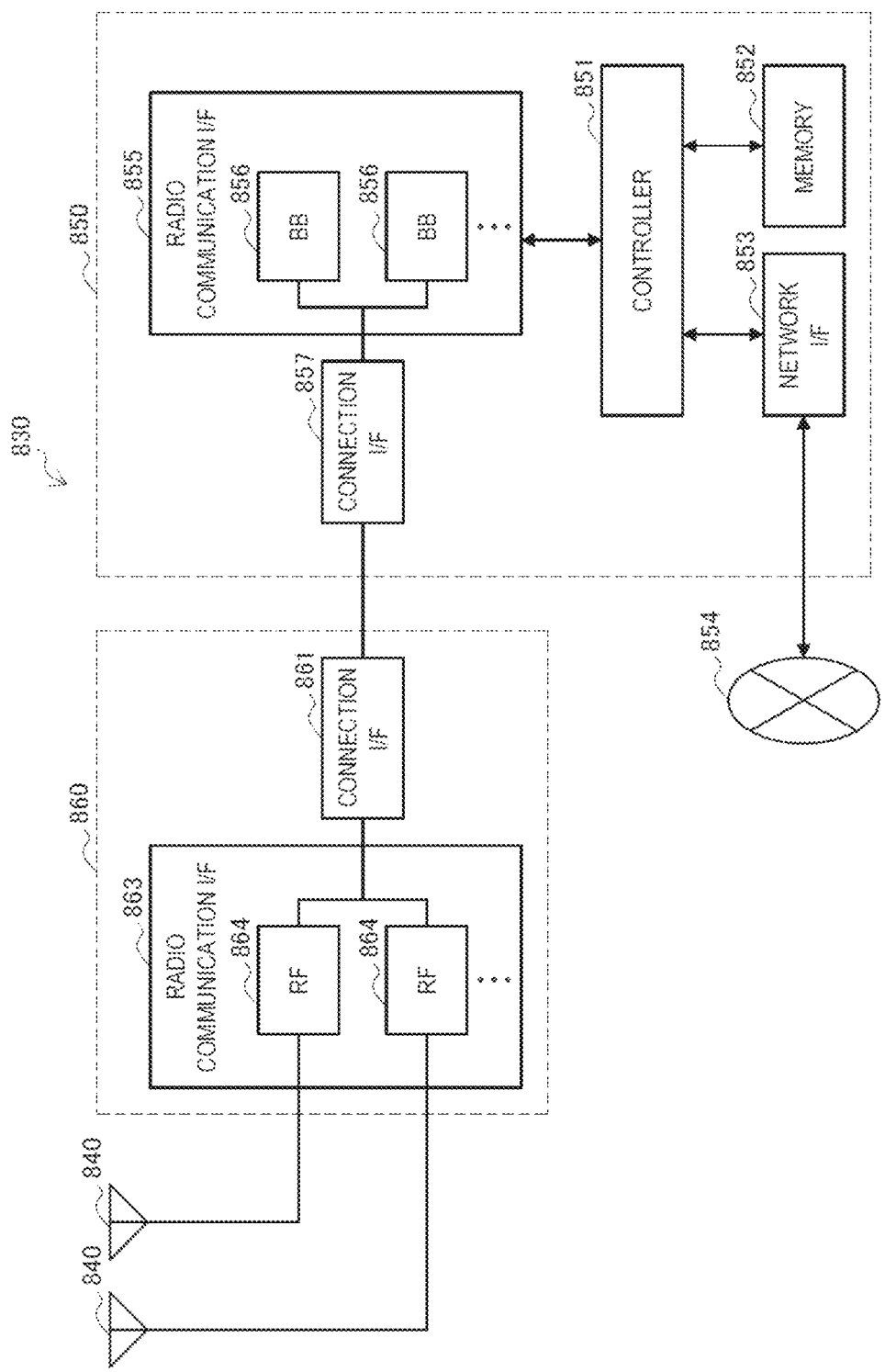
FIG. 11 is a block diagram illustrating a second example of the electronic device on the side of network control according to embodiments of the present disclosure.

FIG. 11 is a block diagram illustrating a second example of a schematic configuration of the network control device to which a technology of the present application may be applied. The network control device can include for example the electronic device 300 or 600 for downlink transmission. In FIG. 11, the network control device is illustrated as gNB 830. The gNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

The antennas 840 includes one or more antenna arrays as described above, and the antenna array includes multiple antenna elements such as multiple antenna elements included in an MIMO antenna and is used for the RRH 860 to transmit and receive radio signals. The gNB 830 may include multiple antennas 840, as illustrated in FIG. 11. For example, multiple antennas 840 may be compatible with multiple frequency bands used by the gNB 830. FIG. 11 illustrates an example in which the gNB 830 includes multiple antennas 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 10.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 10, except the BB processor 856 is connected to the RF circuit 864 of the RRH 860 via the connection interface 857. The radio communication interface 855 may include the multiple BB processors 856, as illustrated in FIG. 11. For example, multiple BB processors 856 may be compatible with multiple frequency bands used by the gNB 830. Although FIG. 11 illustrates the example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit KM may include, for example, a mixer, a filler, and an amplifier, and transmits and receives radio signals via the antenna 840. The radio communication interface 863 may include multiple RF circuits 864, as illustrated in FIG. 11. For example, multiple RF circuits 864 may support multiple antenna elements. Although FIG. 11 illustrates the example in which the radio communication interface 863 includes the multiple RF circuits 864, the radio communication interface 863 may also include a single RF circuit 864.

In the gNB 830 illustrated in FIG. 11, one or more of the components (the allocating 302 or 602) of the processing circuitry 301 described with reference to FIG. 3A or the processing circuitry 601 described with reference to FIG. 6A may be implemented in the radio communication interface 855. Alternatively, at least a part of these components may be implemented in the controller 851. As an example, the gNB 830 include a part (for example, the BB processor 836) or the entire of the radio communication interface 855 and/or a module including the controller 851, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 830, and the radio communication interface 855 (for example, the BB processor 856) and/or the controller 851 may execute the program. As described above, as a device including the one or more components, the gNB 830, the base station device 850 or the module may be provided. A program causing the processor to function as the one or more components may also be provided. In addition, a readable medium in which the program is recorded may be provided.

3.2 Applications Related in Electronic Device on the User Side

First Application Example

Figure 12:
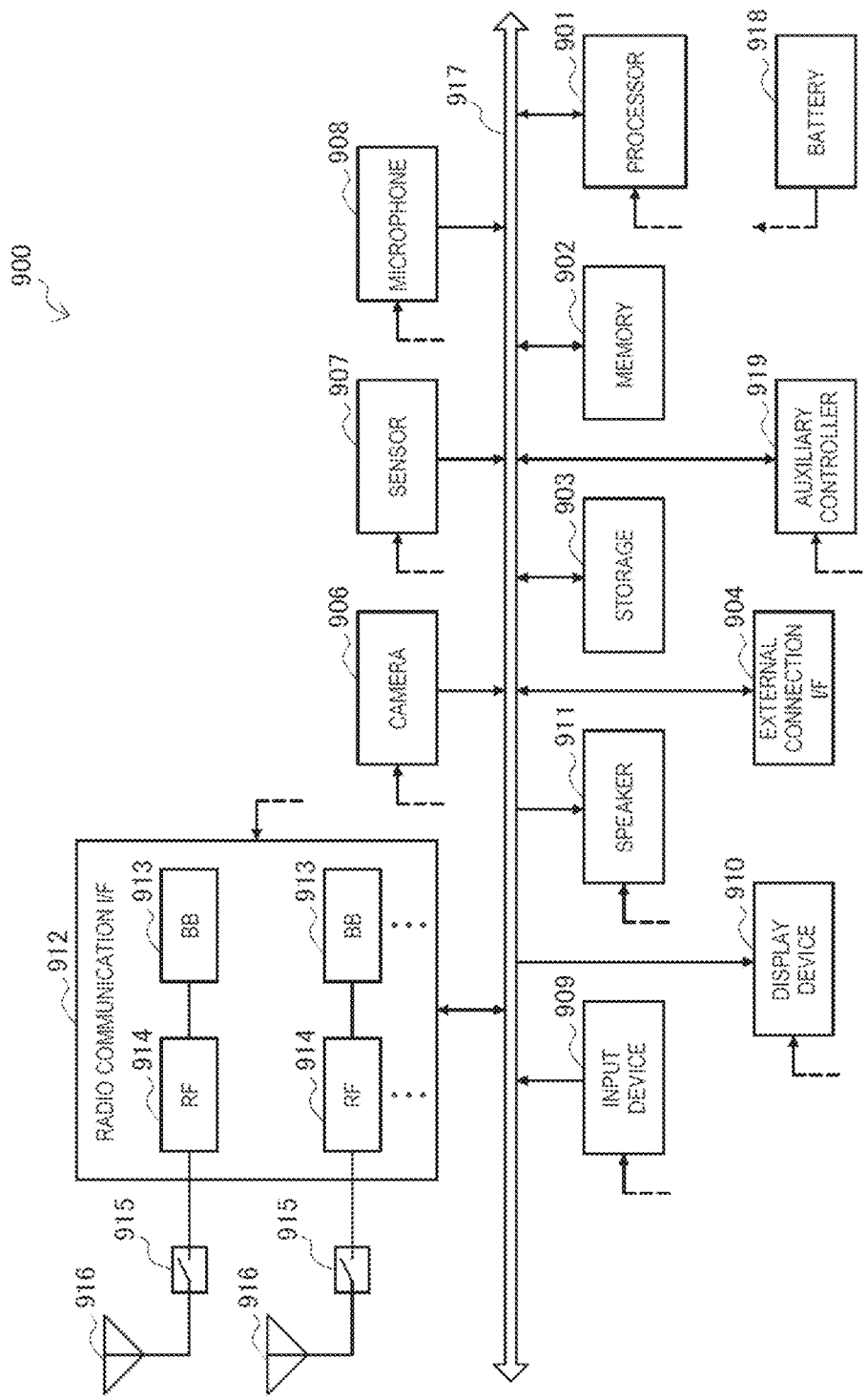
FIG. 12 is a block diagram illustrating an example of schematic configuration of a smart phone according to embodiments of the present disclosure.

FIG. 12 is a block diagram illustrating an example of a schematic configuration of a smartphone 900 to which a technology of the present application may be applied. Wherein, the smart phone 900 can be implemented as the electronic device 200 described with reference to FIG. 2A or the electronic device 700 described with reference to FIG. 7A. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC) and controls functions of an application layer and the other layers of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts the sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that integrates the BB processor 913 and the RF circuit 914 thereon. The radio communication interface 912 may induce multiple BB processors 913 and multiple RF circuits 914, as illustrated in FIG. 12. Although FIG. 12 illustrates the example in which the radio communication interface 912 includes multiple BB processors 913 and multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a wireless local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements such as multiple antenna elements included in an MIMO antenna, and is used for the radio communication interface 912 to transmit and receive radio signals. The smartphone 900 may include multiple antennas 916, as illustrated in FIG. 12. Although FIG. 12 illustrates the example in which the smartphone 900 includes multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 12 via feeder lines, which are partially shown as dashed lines in the figure. The auxiliary controller 919 operates a minimum necessary function of the smartphone 900, for example, in a sleep mode.

In the smartphone 900 illustrated in FIG. 12, one or more of the components comprised in the processing circuitry 201 (the reporting unit 202, the determining unit 203, the notifying unit 204) described with reference to FIG. 2A or one or more of the components comprised in the processing circuitry 701 (the reporting unit 702, the notification receiving unit 703) described with reference to FIG. 7A may be implemented in the radio communication interface 912. Alternatively, at least a part of these components may also be implemented in the processor 901 or the auxiliary controller 919. As an example, the smartphone 900 include a part (for example, the BB processor 913) or the entire of the radio communication interface 912, and/or a module including the processor 901 and/or the auxiliary controller 919, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the smartphone 900, and the radio communication interface 912 (for example, the BB processor 913), the processor 901 and/or the auxiliary controller 919 may execute the program. As described above, as a device including the one or more components, the smartphone 900 or the module may be provided. A program causing the processor to function as the one or more components may also be provided. In addition, a readable medium in which the program is recorded may be provided.

In addition, in the smartphone 900 illustrated in FIG. 12, for example, the communication unit 205 described with reference to FIG. 2A or the communication unit 705 described with reference to FIG. 7A may be implemented in the radio communication interface 912, for example, the RF circuit 914.

Second Application Example

Figure 13:
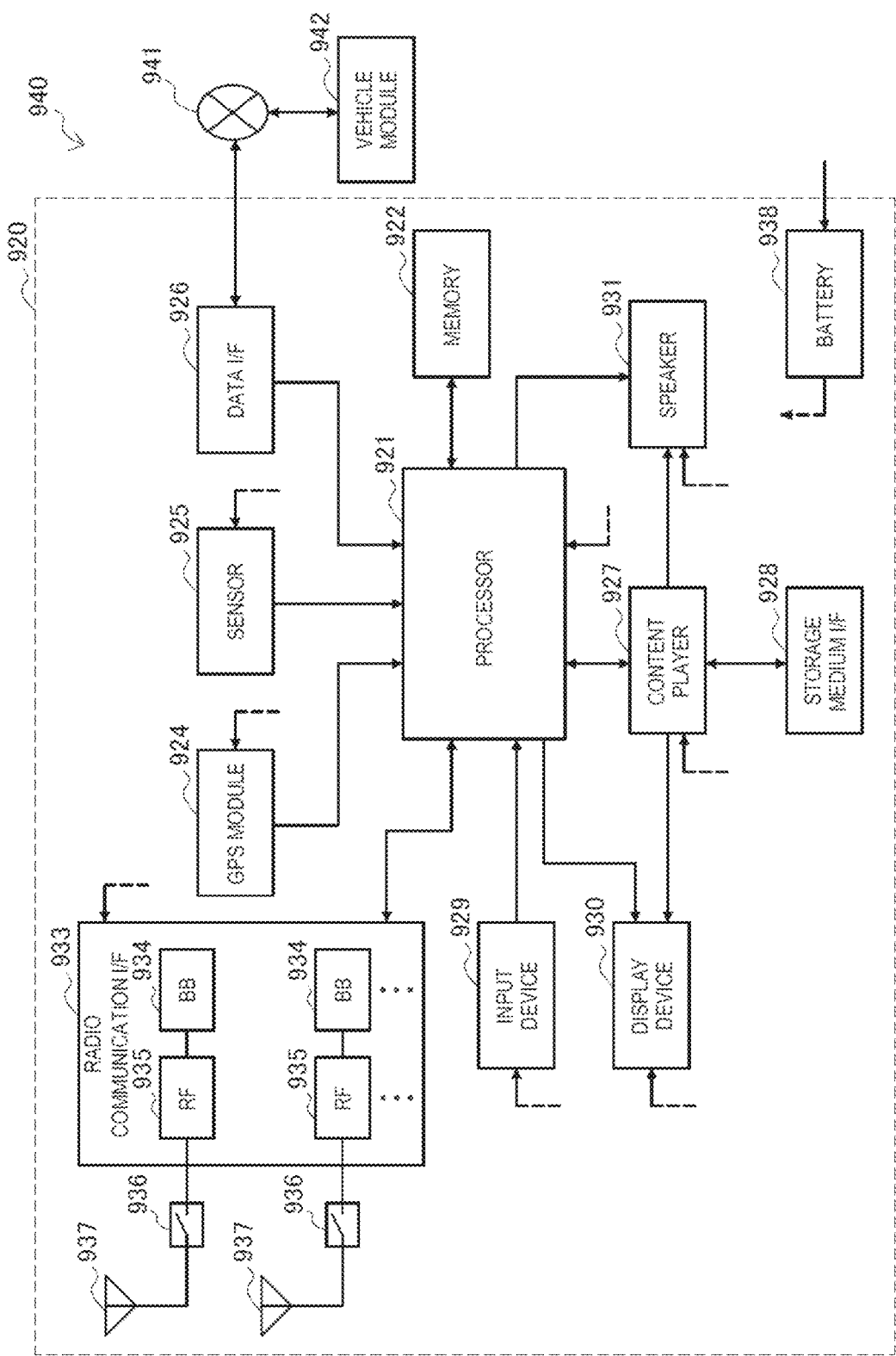
FIG. 13 is a block diagram illustrating an example of schematic configuration of an automobile navigation device according to embodiments of the present disclosure.

FIG. 13 is a block diagram illustrating an example of a schematic configuration of a car navigation device 920 to which an embodiment of the technology of the present application may be applied. Wherein the car navigation device 920 can be implemented as the electronic device 200 described with reference to FIG. 2A or the electronic device 700 described with reference to FIG. 7A. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and other functions of the car navigation device 920. The memory 922 includes RAM and ROM, and stores a program that is executed by the processor 921, and data.

The GPS module 924 uses GPS signals received from a GPS satellite to measure a position, such as latitude, longitude, and altitude, of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium, such as a CD and a DVD, that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme, such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module which integrates the BB processor 934 and the RF circuit 935 thereon. The radio communication interface 933 may induce multiple BB processors 934 and multiple RF circuits 935, as illustrated in FIG. 13. Although FIG. 13 illustrates the example in which the radio communication interface 933 includes multiple BB processors 934 and multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a wireless LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements, such as multiple antenna elements included in an MIMO antenna, and is used for the radio communication interface 933 to transmit and receive radio signals. The car navigation device 920 may include the multiple antennas 937, as illustrated in FIG. 13. Although FIG. 13 illustrates the example in which the car navigation device 920 includes multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 13 via feeder lines that are partially shown as dashed lines in the figure. The battery 938 accumulates power supplied from the vehicle.

In the car navigation device 920 illustrated in FIG. 13, one or more of the components comprised in the processing circuitry 201 (the reporting unit 202, the determining unit 203, the notifying unit 204) described with reference to FIG. 2A or one or more of the components comprised in the processing circuitry 701 (the reporting unit 702, the notification receiving unit 703) described with reference to FIG. 7A may be implemented in the radio communication interface 933. Alternatively, at least a part of these components may also be implemented in the processor 921. As an example, the car navigation device 920 includes a part (for example, the BB processor 934) or the entire of the radio communication interface 933 and/or a module including the processor 921, and the one or more components may be implemented in the module. In this case, the module may store a program (in other words, a program causing the processor to execute operations of the one or more components) causing the processor to function as the one or mere components, and execute the program. As another example, a program causing the processor to function as the one or more components may be installed in the car navigation device 920, and the radio communication interface 933 (for example, the BB processor 934) and/or the processor 921 may execute the program. As described above, as a device including the one or more components, the car navigation device 920 or the module may be provided. A program causing the processor to function as the one or more components may also be provided. In addition, a readable medium in which the program is recorded may be provided.

In addition, in the car navigation device 920 illustrated in FIG. 13, for example, the communication unit 205 described with reference to FIG. 2A or the communication unit 705 described with reference to FIG. 7A may be implemented in the radio communication interface 933, for example, the RF circuit 935.

Technology of the present application may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

In addition, a readable storage medium recoding a program therein can be provided. Therefore, the present disclosure also relates to a computer readable storage medium storing a program including instructions thereon, which, when loaded into and executed by the processing circuitry, are used to perform the communication methods as described in FIGS. 2B, 3B, 6B and 7B.

Although the illustrative embodiments of the present disclosure have been described with reference to the accompanying drawings, the present disclosure is certainly not limited to the above examples. Those skilled in the art can achieve various adaptions and modifications within the scope of the appended claims, and it will be appreciated that these adaptions and modifications certainly fall into the scope of the technology of the present disclosure.

For example, in the above embodiments, the multiple functions included in one module can be implemented by separate means. Alternatively, in the above embodiments, the multiple functions included in multiple modules can be implemented by separate means, respectively. In additions, one of the above functions can be implemented by multiple modules. Needless to say, such configurations are included in the scope of the technology or the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order can be changed appropriately.

Although the present disclosure and its advantages have been described in detail, it will be appreciated that various changes, replacements and transformations can be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device in a wireless communication system comprising
a processing circuitry configured to
report, to a network control device, a first type of channel state information (CSI) by using a resource for a first type of channel state feedback allocated by the network control device;
make a determination that a second type of channel state feedback is required, the determination being made based on an orthogonality between a communication resource used by the electronic device and a communication resource used by another electronic device; and
notify the network control device of the determination.

2. An electronic device in a wireless communication system comprising
a processing circuitry configured to
allocate a resource for a first type of channel state feedback to a user device;
make a determination that a second type of channel state feedback is required, the determination being made based on an orthogonality between a communication resource used by the user device and a communication resource used by another user device; and
notify the user device of the determination.

3. The electronic device according to claim 1, wherein the orthogonality is decided based on a scrambling code sequence of demodulation reference signal (DMRS) port used by the electronic device and a scrambling code sequence of DMRS port used by the another electronic device.

4. The electronic device according to claim 3, wherein the electronic device requests the network control device for information on the scrambling code sequence of DMRS port used by the another electronic device.

5. The electronic device according to claim 1, wherein the determination is made based on a degradation degree of channel quality of a channel between the electronic device and the network control device.

6. The electronic device according to claim 5, wherein the degradation degree is indicated by a difference between the channel quality in a single-user communication and the channel quality in a multi-user communication of the electronic device and the network control device.

7. The electronic device according to claim 1, wherein the notifying is implemented with information indicating category of the second type of channel state feedback.

8. The electronic device according to claim 7, wherein the information indicating category of the second type of channel state feedback is contained in uplink control information (UCI).

9. The electronic device according to claim 1, wherein the processing circuitry is further configured to report, to the network control device, a second type of CSI by using a resource for the second type of channel state feedback allocated by the network control device.

10. The electronic device according to claim 2, wherein the processing circuitry is further configured to allocate a resource for the second type of channel state feedback to the electronic device so as to allow the electronic device to report a second type of CSI.

11. The electronic device according to claim 1, wherein a communication between the electronic device and the network control device is a part of multi-user multi-input multi-output (MU-MIMO) communication.

12. The electronic device according to claim 1, wherein the second type of channel state feedback includes any of pre-coding feedback based on linearly combined codebook, feedback based on covariance matrix, and hybrid CSI feedback.

13. An electronic device in a wireless communication system comprising
a processing circuitry configured to
allocate a resource for a first type of channel state feedback to a user device;
receive, from the user device, a notification regarding a determination that a second type of channel state feedback is required, the determination being made based on an orthogonality between a communication resource used by the user device and a communication resource used by another user device;
allocate a resource for the second type of channel state feedback to the user device; and
receive a second type of channel state information (CSI).

14. An electronic device in a wireless communication system comprising
a processing circuitry configured to
report, to a network control device, a first type of channel state information (CSI) by using a resource for a first type of channel state feedback allocated by the network control device;
receive, from the network control device, a notification regarding a determination that a second type of channel state feedback is required, the determination being made based on an orthogonality between a communication resource used by the electronic device and a communication resource used by another electronic device; and
report, to the network control device, a second type of CSI by using a resource for the second type of channel state feedback allocated by the network control device.

15. The electronic device according to claim 13, wherein the orthogonality is decided based on a scrambling code sequence of demodulation reference signal (DMRS) port used by the user device and a scrambling code sequence of DMRS port used by the another user device.

16. The electronic device according to claim 1, wherein the determination is made based on a degradation degree of channel quality of a channel between the electronic device and the network control device.

17. The electronic device according to claim 1, wherein the notification is implemented with information indicating category of the second type of channel state feedback.

18. The electronic device according to claim 1, wherein the communication between the electronic device and the network control device is a part of multi-user multi-input multi-output (MU-MIMO) communication.

19. The electronic device according to claim 1, wherein the second type of channel state feedback includes any of pre-coding feedback based on linearly combined codebook, feedback based on covariance matrix, and hybrid CST feedback.

* * * * *